US011877346B2

(12) United States Patent
Li et al.

(10) Patent No.: US 11,877,346 B2
(45) Date of Patent: Jan. 16, 2024

(54) SERVICE TRANSMISSION METHOD AND APPARATUS

(71) Applicant: HUAWEI TECHNOLOGIES CO., LTD., Guangdong (CN)

(72) Inventors: Yongcui Li, Beijing (CN); Fangyuan Zhu, Beijing (CN); Yan Li, Beijing (CN); Hui Ni, Beijing (CN); Yang Xin, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 411 days.

(21) Appl. No.: 17/140,460

(22) Filed: Jan. 4, 2021

(65) Prior Publication Data
US 2021/0127255 A1   Apr. 29, 2021

Related U.S. Application Data

(63) Continuation of application No. PCT/CN2019/093317, filed on Jun. 27, 2019.

(30) Foreign Application Priority Data

Jul. 5, 2018   (CN) .......................... 201810732368.5

(51) Int. Cl.
H04W 8/08 (2009.01)
H04W 76/11 (2018.01)
H04W 84/18 (2009.01)

(52) U.S. Cl.
CPC .............. H04W 8/08 (2013.01); H04W 76/11 (2018.02); H04W 84/18 (2013.01)

(58) Field of Classification Search
CPC ....... H04W 8/08; H04W 76/11; H04W 84/18; H04W 36/0069; H04W 88/14;
(Continued)

(56) References Cited

U.S. PATENT DOCUMENTS

2015/0133122 A1   5/2015   Chen
2015/0264601 A1*  9/2015   Cha ................... H04W 36/0055
                                              455/436
(Continued)

FOREIGN PATENT DOCUMENTS

CA      2861941 A1 *  8/2013  ............ H04W 12/04
CN      103188663 A      7/2013
(Continued)

OTHER PUBLICATIONS

3GPP TS 23.502 V0.2.0 (Feb. 2017);3rd Generation Partnership Project;Technical Specification Group Services and System Aspects;Procedures for the 5G System; Stage 2(Release 15);Total 71 Pages.
(Continued)

Primary Examiner — Said M Elnoubi
(74) Attorney, Agent, or Firm — WOMBLE BOND DICKINSON (US) LLP

(57) ABSTRACT

A service transmission method and apparatus are provided to establish a connection between an access and mobility management function network element and a secondary base station, when a master base station is not capable of continuing to provide a service for a terminal device. In an embodiment, an access and mobility management function network element determines that a master base station is not capable of continuing to provide a service for a terminal device. The access and mobility management function network element sends a mobility management context of the terminal device to a secondary base station, where the mobility management context is used by the secondary base station to perform mobility management on the terminal device. Therefore, a signaling connection between the access and mobility management function network element and the secondary base station can be quickly established, (Continued)

thereby ensuring service transmission and improving user experience.

16 Claims, 11 Drawing Sheets

(58) Field of Classification Search
CPC ..... H04W 76/15; H04W 76/19; H04W 76/18; H04W 88/18
See application file for complete search history.

(56) References Cited

U.S. PATENT DOCUMENTS

| | | |
|---|---|---|
| 2016/0044744 A1 | 2/2016 | Lee et al. |
| 2017/0331670 A1 | 11/2017 | Parkvall et al. |
| 2018/0123920 A1 | 5/2018 | Dudda et al. |

FOREIGN PATENT DOCUMENTS

| | | | |
|---|---|---|---|
| CN | 104301955 A | 1/2015 | |
| CN | 104469869 A | 3/2015 | |
| CN | 104812010 A | 7/2015 | |
| CN | 106851750 A | 6/2017 | |
| CN | 107295587 A | 10/2017 | |
| EP | 2945459 A1 * | 11/2015 | ............ H04W 24/02 |
| WO | 2015115458 A1 | 8/2015 | |

OTHER PUBLICATIONS

3rd Generation Partnership Project;Technical Specification Group Services and System Aspects;System Architecture for the 5G System;Stage 2(Release 15),3GPP TS 23.501 V15.2.0 (Jun. 2018),total 216pages.

3GPP TS 37.340 V15.2.0 (Jun. 2018);3rd Generation Partnership Project;Technical Specification Group Radio Access Network;Evolved Universal Terrestrial Radio Access (E-UTRA) and NR;Multi-connectivity;Stage 2(Release 15);Total 55 Pages.

3rd Generation Partnership Project; Technical Specification Group Radio Access Network;Study on Scenarios and Requirements for Next Generation Access Technologies;(Release 14),3GPP TR 38.913 V14.3.0 (Jun. 2017),total 39 pages.

Huawei,"NG based mobility", 3GPP TSG-RAN3 Meeting AH-1801 R3-180470,Sophia Antipolis, France, Jan. 22-26, 2018, Total 4 Pages.

Huawei, HiSilicon, Correction to RAN Initiated QoS Flow Mobility Procedure for Dual Connectivity. 3GPP TSG-SA WG2 Meeting #126, Feb. 26-Mar. 2, 2018, Montreal, Canada, S2-181551, 4 pages.

* cited by examiner

SERVICE TRANSMISSION METHOD AND APPARATUS

CROSS-REFERENCE TO RELATED APPLICATIONS

This application is a continuation of International Patent Application No. PCT/CN2019/093317, filed on Jun. 27, 2019, which claims priority to Chinese Patent Application No. 201810732368.5, filed on Jul. 5, 2018. The disclosures of the aforementioned applications are hereby incorporated by reference in their entireties.

TECHNICAL FIELD

This application relates to the field of wireless communications technologies, and in particular, to a service transmission method and apparatus.

BACKGROUND

As shown in FIG. 1, a dual connectivity (DC) architecture includes two base stations: a master base station (also referred to as a master radio access network (RAN) device or M-RAN) and a secondary base station (also referred to as a secondary RAN device or S-RAN). A connection between the M-RAN and an access and mobility management function (AMF) network element is an N2 connection. There is no signaling connection between the S-RAN and the AMF, and a connection between the M-RAN and the S-RAN is an Xn connection. A connection between the M-RAN and user equipment (UE) is a radio resource control (RRC) connection, and a connection between the S-RAN and the UE is an RRC connection.

When a fault occurs in at least one of the N2 connection or the RRC connection between the M-RAN and the UE, the M-RAN is not capable of continuing to provide a service for the UE, and all the connections in FIG. 1 are triggered to be released. Consequently, a UE service is interrupted. In this case, if the UE wants to continue to access an original service, the UE needs to re-establish a session. However, the re-establishment of the session requires extra signaling overheads and takes a relatively long time. Consequently, user experience is relatively poor.

SUMMARY

Embodiments of this application provide a service transmission method and apparatus, to establish a connection between an AMF and an S-RAN when an M-RAN is not capable of continuing to provide a service for UE.

According to a first aspect, an embodiment of this application provides a service transmission method. An access and mobility management function network element obtains that a master base station is not capable of continuing to provide a service for a terminal device; and the access and mobility management function network element sends a mobility management context of the terminal device to a secondary base station, where the mobility management context is used by the secondary base station to perform mobility management on the terminal device.

According to the foregoing method, after the access and mobility management function network element obtains that the master base station is not capable of continuing to provide the service for the terminal device, the access and mobility management function network element sends the mobility management context of the terminal device to the secondary base station, to quickly establish a signaling connection between the access and mobility management function network element and the secondary base station, thereby ensuring service transmission and improving user experience.

In an embodiment, before the access and mobility management function network element sends the mobility management context of the terminal device to the secondary base station, the access and mobility management function network element receives an identifier of the secondary base station from the master base station; or after receiving a first message from the secondary base station, the access and mobility management function network element determines an identifier of the secondary base station.

According to the foregoing method, the access and mobility management function network element may obtain the identifier of the secondary base station. When sending the mobility management context of the terminal device to the secondary base station, the access and mobility management function network element may send the mobility management context of the terminal device to the secondary base station based on the identifier of the secondary base station.

In an embodiment, in determining that the master base station is not capable of continuing to provide the service for the terminal device, the access and mobility management function network element determines that a fault occurs in a connection between the master base station and the terminal device; or the access and mobility management function network element determines that a fault occurs in a connection between the master base station and the access and mobility management function network element.

According to the foregoing method, the access and mobility management function network element may determine a specific reason for a fault that the master base station is not capable of continuing to provide the service for the terminal device.

In an embodiment, in determining that the master base station is not capable of continuing to provide the service for the terminal device, the access and mobility management function network element receives first indication information from the secondary base station, and the access and mobility management function network element determines, based on the first indication information, that the master base station is not capable of continuing to provide the service for the terminal device; or the access and mobility management function network element receives second indication information from the terminal device, where the second indication information is used to indicate that the master base station is not capable of continuing to provide the service for the terminal device.

According to the foregoing method, the access and mobility management function network element may determine, by using a plurality of methods, that the master base station is not capable of continuing to provide the service for the terminal device.

In an embodiment, after the access and mobility management function network element determines that the master base station is not capable of continuing to provide the service for the terminal device, the access and mobility management function network element sends a session management context to the secondary base station, where the session management context is used to reconfigure a connection between the secondary base station and the terminal device.

According to the foregoing method, the access and mobility management function network element may send the session management context to the secondary base station, so that the secondary base station reconfigures the connection between the secondary base station and the terminal device based on the session management context.

In an embodiment, the second indication information includes a session identifier. Before the access and mobility management function network element sends the session management context to the secondary base station, the access and mobility management function network element requests the session management context corresponding to the session identifier from a session management function network element corresponding to the session identifier; and the access and mobility management function network element receives the session management context corresponding to the session identifier from the session management function network element corresponding to the session identifier.

According to the foregoing method, when a service is at a session granularity, the access and mobility management function network element may obtain the session identifier based on the second indication information, and request the corresponding session management context from the session management function network element corresponding to the session identifier.

In an embodiment, the second indication information includes a service flow identifier and a session identifier corresponding to the service flow identifier. Before the access and mobility management function network element sends the session management context to the secondary base station, the access and mobility management function network element requests the session management context corresponding to the service flow identifier from a session management function network element corresponding to the session identifier that corresponds to the service flow identifier; and the access and mobility management function network element receives the session management context corresponding to the service flow identifier from the session management function network element corresponding to the session identifier that corresponds to the service flow identifier.

According to the foregoing method, when a service is at a service flow granularity, the access and mobility management function network element may obtain, based on the second indication information, the service flow identifier and the session identifier corresponding to the service flow identifier, and request the session management context corresponding to the service flow identifier from the session management function network element corresponding to the session identifier.

In an embodiment, when the access and mobility management function network element sends the mobility management context of the terminal device to the secondary base station, the access and mobility management function network element sends the mobility management context and user identifier information that are of the terminal device to the secondary base station, where the user identifier information is used to indicate the secondary base station to associate the mobility management context of the terminal device with a radio bearer, and the radio bearer is a radio bearer between the terminal device and the secondary base station.

According to the foregoing method, the access and mobility management function network element may send the mobility management context and the user identifier information that are of the terminal device, so that the secondary base station can associate the mobility management context of the terminal device with the radio bearer, to establish an association relationship between the mobility management context of the terminal device and the terminal device.

In an embodiment, before the access and mobility management function network element obtains that the master base station is not capable of continuing to provide the service for the terminal device, the access and mobility management function network element receives the user identifier information from the secondary base station by using the master base station; or the access and mobility management function network element sends the user identifier information to the secondary base station by using the master base station, where the user identifier information is used by the secondary base station to determine an association between the user identifier information and the radio bearer.

According to the foregoing method, the access and mobility management function network element may obtain the user identifier information in advance.

According to a second aspect, an embodiment of this application provides a service transmission method. A terminal device determines that a master base station is not capable of continuing to provide a service for the terminal device; and notifies, by using a secondary base station, an access and mobility management function network element that the master base station is not capable of continuing to provide the service for the terminal device.

According to the foregoing method, when determining that the master base station is not capable of providing the service for the terminal device, the terminal device may trigger the secondary base station to establish a connection between the secondary base station and the access and mobility management function network element, thereby ensuring service transmission and improving user experience.

In an embodiment, before the terminal device determines that the master base station is not capable of continuing to provide the service for the terminal device, the terminal device receives indication information from the master base station or a session management function network element, where the indication information is used to indicate the terminal device to notify, when determining that the master base station is not capable of continuing to provide the service for the terminal device, the access and mobility management function network element that the master base station is not capable of continuing to provide the service for the terminal device.

According to the foregoing method, when determining, based on the indication information, that the master base station is not capable of continuing to provide the service for the terminal device, the terminal device may retain a user plane connection between the terminal device and the secondary base station, and notify the access and mobility management function network element that the master base station is not capable of continuing to provide the service for the terminal device.

In an embodiment, that the terminal device determines that the master base station is not capable of continuing to provide the service for the terminal device may mean that the terminal device determines that a fault occurs in a connection between the master base station and the terminal device.

According to the foregoing method, when determining that the fault occurs in the connection between the master base station and the terminal device, the terminal device may determine that the master base station is not capable of continuing to provide the service for the terminal device.

According to a third aspect, an embodiment of this application provides a service transmission method. A secondary base station receives an identifier of an access and mobility management function network element from a master base station; the secondary base station determines that a fault occurs in a connection between the master base station and the secondary base station; the secondary base station notifies the access and mobility management function network element that the fault occurs in the connection between the master base station and the secondary base station; and the secondary base station receives a mobility management context of a terminal device from the access and mobility management function network element.

According to the foregoing method, when determining that the fault occurs in the connection between the master base station and the secondary base station, the secondary base station may notify the access and mobility management function network element of the fault, and receive the mobility management context of the terminal device from the access and mobility management function network element, so that the secondary base station establishes a connection between the secondary base station and the access and mobility management function network element, thereby ensuring service transmission and improving user experience.

In an embodiment, the secondary base station receives a session management context from the access and mobility management function network element, where the session management context is used to reconfigure a connection between the secondary base station and the terminal device.

According to the foregoing method, the secondary base station receives the session management context from the access and mobility management function network element, so that the secondary base station reconfigures the connection between the secondary base station and the terminal device based on the session management context.

In an embodiment, when the secondary base station receives the mobility management context of the terminal device from access and mobility management function network element, the secondary base station receives the mobility management context and user identifier information from the access and mobility management function network element, and the secondary base station associates the mobility management context of the terminal device with a radio bearer, where the radio bearer is a radio bearer between the terminal device and the secondary base station.

According to the foregoing method, the secondary base station may receive the mobility management context and the user identifier information that are of the terminal device from the access and mobility management function network element, so that the secondary base station can associate the mobility management context of the terminal device with the radio bearer, to establish an association relationship between the mobility management context of the terminal device and the terminal device.

In an embodiment, before the secondary base station receives the mobility management context and the user identifier information from the access and mobility management function network element, the secondary base station receives the user identifier information from the access and mobility management function network element; and the secondary base station determines an association between the user identifier information and the radio bearer.

According to the foregoing method, the secondary base station may obtain the user identifier information in advance.

In an embodiment, before the secondary base station receives the mobility management context and the user identifier information from the access and mobility management function network element, the secondary base station sends the user identifier information to the access and mobility management function network element by using the master base station.

According to the foregoing method, the access and mobility management function network element may obtain the user identifier information in advance.

According to a fourth aspect, an embodiment of this application provides a service transmission apparatus. The apparatus may be an access and mobility management function network element, or may be a chip in an access and mobility management function network element. The apparatus may include a processing unit, a sending unit, and a receiving unit. When the apparatus is an access and mobility management function network element, the processing unit may be a processor, and the sending unit and the receiving unit may be a transceiver. The access and mobility management function network element may further include a storage unit, and the storage unit may be a memory. The storage unit is configured to store an instruction, and the processing unit executes the instruction stored in the storage unit, so that the access and mobility management function network element performs the method according to any one of the first aspect or the possible designs of the first aspect. When the apparatus is a chip in an access and mobility management function network element, the processing unit may be a processor, and the sending unit and the receiving unit may be an input/output interface, a pin, a circuit, or the like. The processing unit executes the instruction stored in the storage unit, so that the chip performs the method according to any one of the first aspect or the possible designs of the first aspect. The storage unit is configured to store an instruction. The storage unit may be a storage unit (for example, a register or a cache) in the chip, or may be a storage unit (for example, a read-only memory or a random access memory) that is in the access and mobility management function network element and that is located outside the chip.

According to a fifth aspect, an embodiment of this application provides a service transmission apparatus. The apparatus may be a terminal device, or may be a chip in a terminal device. The apparatus may include a processing unit, a sending unit, and a receiving unit. When the apparatus is a terminal device, the processing unit may be a processor, and the sending unit and the receiving unit may be a transceiver. The terminal device may further include a storage unit, and the storage unit may be a memory. The storage unit is configured to store an instruction, and the processing unit executes the instruction stored in the storage unit, so that the terminal device performs the method according to any one of the second aspect or the possible designs of the second aspect. When the apparatus is a chip in the terminal device, the processing unit may be a processor, and the sending unit and the receiving unit may be an input/output interface, a pin, a circuit, or the like. The processing unit executes the instruction stored in the storage unit, so that the chip performs the method according to any one of the second aspect or the possible designs of the second aspect. The storage unit is configured to store an instruction. The storage unit may be a storage unit (for example, a register or a cache) in the chip, or may be a storage unit (for example, a read-only memory or a random access memory) that is in the terminal device and that is located outside the chip.

According to a sixth aspect, an embodiment of this application provides a service transmission apparatus. The apparatus may be a secondary base station, or may be a chip in a secondary base station. The apparatus may include a processing unit, a sending unit, and a receiving unit. When the apparatus is a secondary base station, the processing unit may be a processor, and the sending unit and the receiving unit may be a transceiver. The secondary base station may further include a storage unit, and the storage unit may be a memory. The storage unit is configured to store an instruction, and the processing unit executes the instruction stored in the storage unit, so that the secondary base station performs the method according to any one of the third aspect or the possible designs of the third aspect. When the apparatus is a chip in a secondary base station, the processing unit may be a processor, and the sending unit and the receiving unit may be an input/output interface, a pin, a circuit, or the like. The processing unit executes the instruction stored in the storage unit, so that the chip performs the method according to any one of the third aspect or the possible designs of the third aspect. The storage unit is configured to store an instruction. The storage unit may be a storage unit (for example, a register or a cache) in the chip, or may be a storage unit (for example, a read-only memory or a random access memory) that is in the secondary base station and that is located outside the chip.

According to a sixth aspect, an embodiment of this application further provides a computer-readable storage medium. The computer-readable storage medium stores a computer program. When the computer program is run on a computer, the computer is enabled to perform the method according to any one of the first aspect to the third aspect.

According to eighth aspect, an embodiment of this application further provides a computer program product that includes a program. When the computer program product runs on a computer, the computer is enabled to perform the method according to any one of the first aspect to the third aspect.

BRIEF DESCRIPTION OF DRAWINGS

FIG. 4(*b*) is a first flowchart of establishing a connection between an AMF and an S-RAN when an M-RAN is not capable of continuing to provide a service for UE according to an embodiment of this application;

DESCRIPTION OF EMBODIMENTS

The following describes the embodiments of this application with reference to the accompanying drawings.

Figure 2:
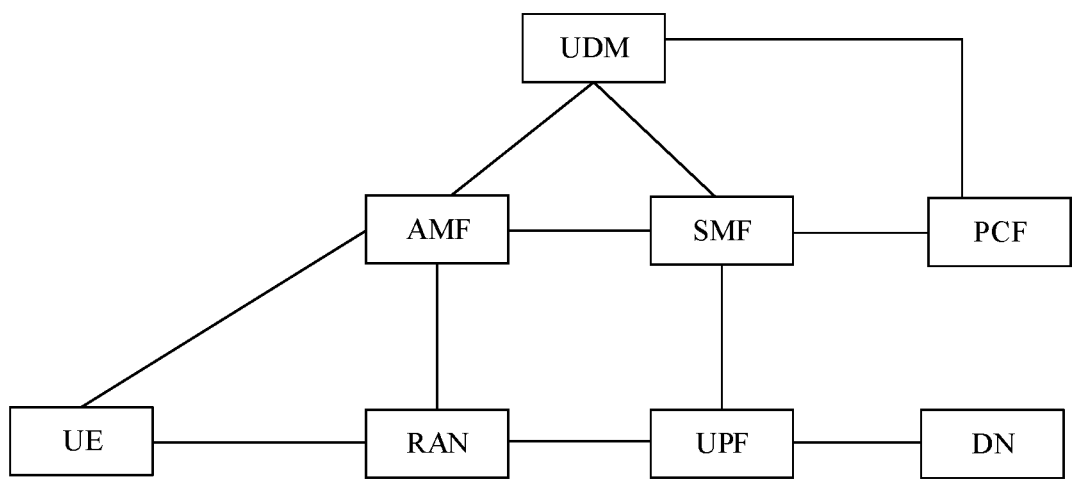
FIG. 2 is a schematic diagram of a 5G system architecture according to an embodiment of this application.

Referring to FIG. 2, a 5G system architecture is divided into two parts: an access network and a core network. A radio access network (RAN) is used to implement functions related to radio access. The core network includes an AMF, a session management function (SMF) network element, a user plane function (UPF) network element, a policy control function (PCF) network element, and a unified data management (UDM) network element.

As shown in FIG. 2, UE in this system is not limited to a 5G network, and includes a mobile phone, a tablet computer, a computer having a wireless transceiver function, an internet of things terminal device, and the like. The UE may also be referred to as a terminal device, a mobile station, a mobile device, a remote station, a remote terminal, an access terminal, a user equipment (UE), or a user agent. This is not limited herein. The UE may alternatively be a vehicle in vehicle-to-vehicle (V2V) communication, a machine in machine type communication, or the like.

The RAN in this system refers to a device that provides radio access for the UE, and may include various forms of base stations, for example, a macro base station, a micro base station (also referred to as a small cell), a relay station, an access point, an evolved NodeB (eNodeB), a wireless fidelity access point (WiFi AP), and a worldwide interoperability for microwave access base station (WiMAX BS). In systems that use different radio access technologies, names of devices that provide a radio access function may be different. For example, the device is referred to as an evolved NodeB (eNB or eNodeB) in an LTE system, and the device is referred to as a NodeB in a 3rd generation (3rd generation, 3G) system. In a new generation system, the device is referred to as a gNB (gNodeB).

The AMF in this system is mainly responsible for mobility management in a mobile network, for example, location update of a user, network registration of a user, and user handover. The AMF network element may also be referred to as an AMF device or an AMF entity.

The SMF in this system is mainly responsible for session management in a mobile network, for example, session establishment, modification, and release. Specific functions may include allocating an IP address to a user, selecting a UPF that provides a packet forwarding function, and so on. The SMF network element may also be referred to as an SMF device or an SMF entity.

The PCF in this system is responsible for providing a policy for the AMF and the SMF, for example, a quality of service (QoS) policy and a slice selection policy. The PCF network element may also be referred to as a PCF device or a PCF entity.

The UDM in the system is used to store user data, such as subscription information and authentication/authorization information. The UPF is mainly responsible for processing a packet of the user, such as forwarding and charging. The UDM network element may also be referred to as a UDM device or a UDM entity.

In an embodiment, the 5G communications system further includes a data network (DN). For example, the DN may be a service provided by an operator, an internet access service, or a service provided by a third party.

The foregoing network elements may be network elements implemented on dedicated hardware, or may be software instances run on dedicated hardware, or may be instances of virtualization functions on a proper platform. For example, the foregoing virtualization platform may be a cloud platform.

In addition, the embodiments of this application are further applicable to another future-oriented communications technology. Network architectures and service scenarios described in this application are intended to describe the technical solutions in this application more clearly, but are not intended to limit the technical solutions provided in this application. A person of ordinary skill in the art may know that as the network architectures evolve and a new service scenario emerges, the technical solutions provided in this application are also applicable to a similar technical problem.

It should be noted that the embodiments of this application are applicable to an application scenario in which packet transmission of a service is implemented by using a DC architecture. The service may be at a session granularity, or may be at a service flow granularity. For example, the UE has a session 1 and a session 2, where the session 1 corresponds to a service flow 1a and a service flow 1b, and the session 2 corresponds to a service flow 2a, a service flow 2b, and a service flow 2c. All packets (that is, all packets of the service flow 1a and all packets of the service flow 1b) of the session 1 are transmitted by using a user plane path of an M-RAN (that is, a user plane path represented by a solid line in FIG. 1). A packet of the service flow 2a of the session 2 is transmitted by using the user plane path of the M-RAN (that is, the user plane path represented by a solid line in FIG. 1). A packet of the service flow 2b is transmitted by using a user plane path of an S-RAN (that is, a user plane path indicated by a dashed line in FIG. 1). A packet of the service flow 2c is transmitted with high reliability by using the user plane path of the M-RAN and the user plane path of the S-RAN (that is, the user plane paths represented by a solid line and a dashed line in FIG. 1). For example, the service flow 2c may be a URLLC (Ultra-Reliable and Low Latency Communications, ultra reliable low latency communication) service flow. A session is represented by a session identifier. A service flow is represented by a service flow identifier, such as an IP 5-tuple or a QFI (QoS flow identifier).

Figure 3:
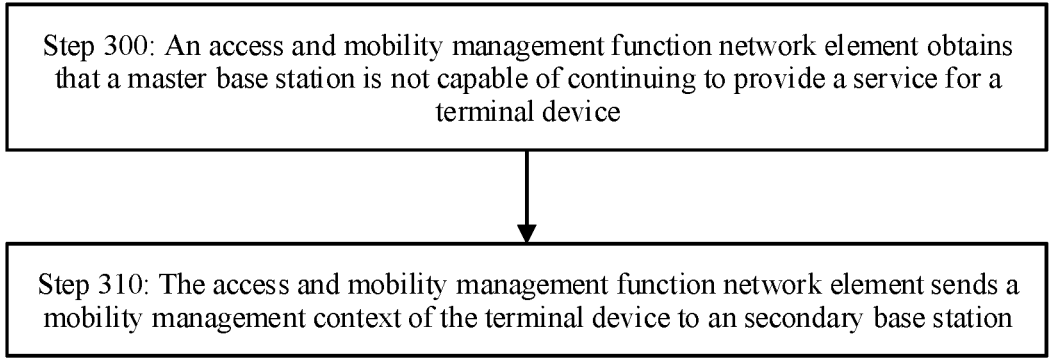
FIG. 3 is an overview flowchart of a service transmission method according to an embodiment of this application.

Referring to FIG. 3, an embodiment of this application provides a service transmission method, to establish a connection between an AMF and an S-RAN when an M-RAN is not capable of continuing to provide a service for UE. The method includes the following operations.

Operation 300: An access and mobility management function network element obtains that a master base station is not capable of continuing to provide a service for a terminal device.

Figure 1:
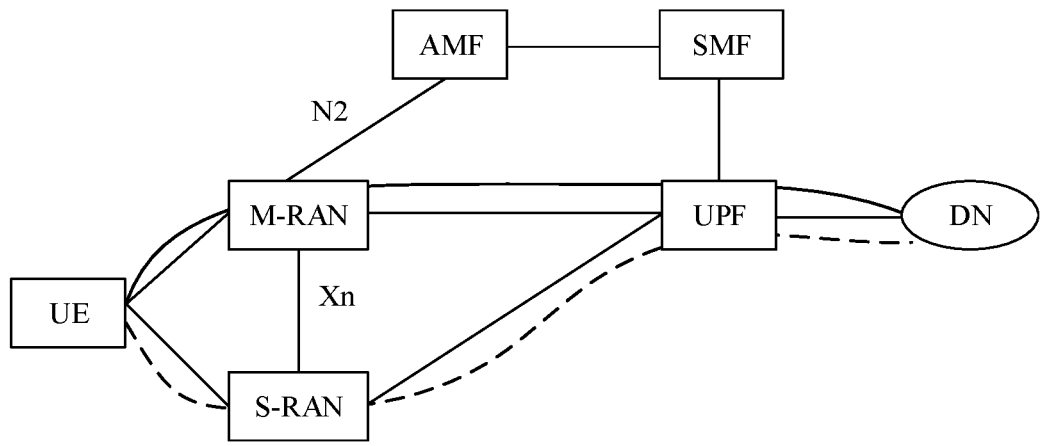
FIG. 1 is a schematic diagram of a dual connectivity architecture according to an embodiment of this application.

For example, the access and mobility management function network element is the AMF network element in FIG. 1, the master base station is the M-RAN device in FIG. 1, and the terminal device is the UE in FIG. 1.

When a fault occurs in at least one of a connection (for example, an N2 connection) between the master base station and the access and mobility management function network element, a connection (for example, an Xn connection) between the master base station and a secondary base station, or a connection (for example, an RRC connection) between the master base station and the terminal device, the master base station is not capable of continuing to provide the service for the terminal device, or a fault occurs in the master base station. That the access and mobility management function network element obtains that the master base station is not capable of continuing to provide the service for the terminal device includes but is not limited to the following possible implementations.

Manner 1: The access and mobility management function network element detects that the master base station is not capable of continuing to provide the service for the terminal device. In a possible design, the access and mobility management function network element may determine that a fault occurs in the connection between the master base station and the access and mobility management function network element. In other words, a fault occurs in the N2 connection. For example, the access and mobility management function network element may detect, by sending a heartbeat packet to the master base station, whether the N2 connection is normal, and when no response to the heartbeat packet is received from the master base station, determine that the fault occurs in the N2 connection.

Manner 2: The access and mobility management function network element receives first indication information from the secondary base station, and determines, based on the first indication information, that the master base station is not capable of continuing to provide the service for the terminal device. In an embodiment, when the secondary base station determines that a fault occurs in the connection between the master base station and the secondary base station, in other words, a fault occurs in the Xn connection, the secondary base station sends the first indication information to the access and mobility management function network element, to notify the access and mobility management function network element that the fault occurs in the Xn connection. After the access and mobility management function network element obtains, based on the first indication information, that the fault occurs in the Xn connection, the access and mobility management function network element determines whether a fault occurs in the N2 connection. When the access and mobility management function network element determines that the fault occurs in the N2 connection, the access and mobility management function network element determines that the master base station is not capable of continuing to provide the service for the terminal device.

In this case, before the secondary base station determines that the fault occurs in the Xn connection, the secondary base station stores an identifier of the access and mobility management function network element. For example, in a process of adding the secondary base station to the master base station, the master base station sends the identifier of the access and mobility management function network element to the secondary base station.

Manner 3: The access and mobility management function network element receives second indication information from the terminal device, where the second indication information is used to indicate that the master base station is not capable of continuing to provide the service for the terminal device. In a possible design, the terminal device determines that the master base station is not capable of continuing to provide the service for the terminal device, the terminal device notifies, by using the secondary base station, the access and mobility management function network element that the master base station is not capable of continuing to provide the service for the terminal device, and the access and mobility management function network element may further obtain that the master base station is not capable of continuing to provide the service for the terminal device.

When the terminal device determines that at least one of the following cases occurs, the terminal device determines that the master base station is not capable of continuing to provide the service for the terminal device:

Case 1: The terminal device detects that a fault occurs in the connection between the master base station and the terminal device. In other words, a fault occurs in the RRC connection.

Case 2: When the master base station detects that a fault occurs in the N2 connection, the master base station notifies the terminal device that the fault occurs in the N2 connection.

That the terminal device notifies, by using the secondary base station, the access and mobility management function network element that the master base station is not capable of continuing to provide the service for the terminal device may include the following two possibilities: First, the secondary base station receives first fault information from the terminal device. The secondary base station may send the first fault information to the access and mobility management function network element in a transparent transmission manner. The first fault information is used to indicate that the master base station is not capable of continuing to provide the service for the terminal device. In this case, the first fault information is the second indication information mentioned in Manner 3. Second, the secondary base station receives second fault information from the terminal device. The secondary base station parses the second fault information, generates third fault information based on the parsed second fault information, and then sends the third fault information to the access and mobility management function network element. In this case, the third fault information is the second indication information mentioned in Manner 3.

In addition, before the terminal device determines that the master base station is not capable of continuing to provide the service for the terminal device, the terminal device receives third indication information from the master base station or a session management function network element. The third indication information is used to indicate the terminal device to notify, when determining that the master base station is not capable of continuing to provide the service for the terminal device, the access and mobility management function network element that the master base station is not capable of continuing to provide the service for the terminal device. In an embodiment, the third indication information is further used to indicate the terminal device, when the terminal device determines that the master base station is not capable of continuing to provide the service for the terminal device, to release a user plane context related to a wireless connection between the terminal device and the master base station, or skip releasing a user plane-related context (for example, a user plane context related to a wireless connection between the terminal device and the secondary base station). In other words, the third indication information indicates the UE not to trigger release procedures of all user plane connections. All the user plane connections refer to user plane connections that pass through the master base station and user plane connections that passes through the secondary base station.

Manner 4: The access and mobility management function network element receives fourth indication information from the master base station, where the fourth indication information is used to indicate that the master base station is not capable of continuing to provide the service for the terminal device. For example, when the master base station detects that a fault occurs in the connection between the master base station and the terminal device, in other words, a fault occurs in the RRC connection, the master base station sends the fourth indication information to the access and mobility management function network element, to notify the access and mobility management function network element that the fault occurs in the RRC connection.

Operation 310: The access and mobility management function network element sends a mobility management context (mobility management context, MM context) of the terminal device to the secondary base station.

For example, the secondary base station is the S-RAN device in FIG. 1.

The MM context is used by the secondary base station to perform mobility management on the terminal device. In addition, the MM context may be further used by the secondary base station to perform security management on the terminal device. For example, the MM context may include information such as an area restriction (service area restriction), an access technology restriction (RAT restriction), and a security context.

Further, after the access and mobility management function network element obtains that the master base station is not capable of continuing to provide the service for the terminal device, the access and mobility management function network element may further send a session management context (SM context) to the secondary base station. The SM context is used to reconfigure a connection between the secondary base station and the terminal device. A user equipment context (UE context) includes the SM context and the MM context.

In an embodiment, the access and mobility management function network element may send the mobility management context and user identifier information that are of the terminal device to the secondary base station. The user identifier information is used to indicate the secondary base station to associate the mobility management context of the terminal device with a radio bearer, and the radio bearer is a radio bearer between the terminal device and the secondary base station, namely, a user plane connection between the terminal device and the secondary base station. Therefore, the secondary base station may establish an association relationship between the MM context and the terminal device based on the user identifier information and the MM context that are received from the access and mobility management function network element. Similarly, if the secondary base station receives the SM context from the access and mobility management function network element, the secondary base station may also establish an association relationship between the SM context and the terminal device. Therefore, finally, the secondary base station may establish an association relationship between the UE context and the terminal device.

To enable the secondary base station to establish an association relationship between the MM context and the terminal device after obtaining the MM context, before the access and mobility management function network element obtains that the master base station is not capable of continuing to provide the service for the terminal device, the access and mobility management function network element and the secondary base station may obtain of the user identifier information in advance. Specifically, the following two possible implementations may be included:

Manner 1: Before the access and mobility management function network element obtains that the master base station is not capable of continuing to provide the service for the terminal device, the access and mobility management function network element receives the user identifier information from the secondary base station by using the master base station. For example, the secondary base station stores an association relationship between user identifier information and a data radio bearer (data radio bearer, DRB). The DRB is the radio bearer between the terminal device and the secondary base station. The secondary base station sends the user identifier information to the access and mobility management function network element in advance by using the master base station. For example, the user identifier information may be an identifier (an S-RAN M-RAN UE ID or an S-RAN UE Xn ID for short) that can uniquely identify the terminal device on an Xn interface and that is allocated by the secondary base station, or an identifier (an M-RAN S-RAN UE ID or an M-RAN UE Xn ID for short) that can uniquely identify the terminal device on an Xn interface and that is allocated by the master base station.

Manner 2: Before the access and mobility management function network element obtains that the master base station is not capable of continuing to provide the service for the terminal device, the access and mobility management function network element sends the user identifier information to the secondary base station by using the master base station. For example, the access and mobility management function network element stores the user identifier information, and sends the user identifier information to the secondary base station in advance by using the master base station, so that the secondary base station stores the user identifier information and establishes an association relationship between the user identifier information and the radio bearer. The user identifier information herein may be an identifier (an AMF M-RAN UE ID or an AMF UE N2AP ID for short) that can uniquely identify the terminal device on an N2 interface and that is allocated by the access and mobility management function network element, an identifier (an AMF N1 UE ID for short) that can uniquely identify the terminal device on an N1 interface and that is allocated by the access and mobility management function network element, or an identifier (an M-RAN AMF UE ID or an M-RAN UE N2AP ID for short) that can uniquely identify the terminal device on the N2 interface and that is allocated by the master base station. The N1 interface is an interface, namely, a non-access stratum (NAS) interface, between the terminal device and the access and mobility management function network element.

In addition, before the access and mobility management function network element sends the mobility management context of the terminal device to the secondary base station, the access and mobility management function network element may receive an identifier of the secondary base station from the master base station. For example, in a session establishment procedure, the access and mobility management function network element may receive the identifier of the secondary base station from the master base station, and store the identifier of the secondary base station. Alternatively, before the access and mobility management function network element sends the mobility management context of the terminal device to the secondary base station, the access and mobility management function network element receives a first message from the secondary base station and determines an identifier of the secondary base station. For example, the first message is a path switch request message. For example, the secondary base station sends a path switch request message to the access and mobility management function network element, and the access and mobility management function network element determines the identifier of the secondary base station based on the path switch request message.

According to the method in this embodiment of the present disclosure, after the access and mobility management function network element obtains that the master base station is not capable of continuing to provide the service for the terminal device, the access and mobility management function network element sends the mobility management context of the terminal device to the secondary base station, to quickly establish a signaling connection between the access and mobility management function network element and the secondary base station, thereby ensuring service transmission and improving user experience. Establishing the signaling connection between the secondary base station and the access and mobility management function network element may also be described as upgrading the secondary base station to the master base station.

Figures 1, 4A:
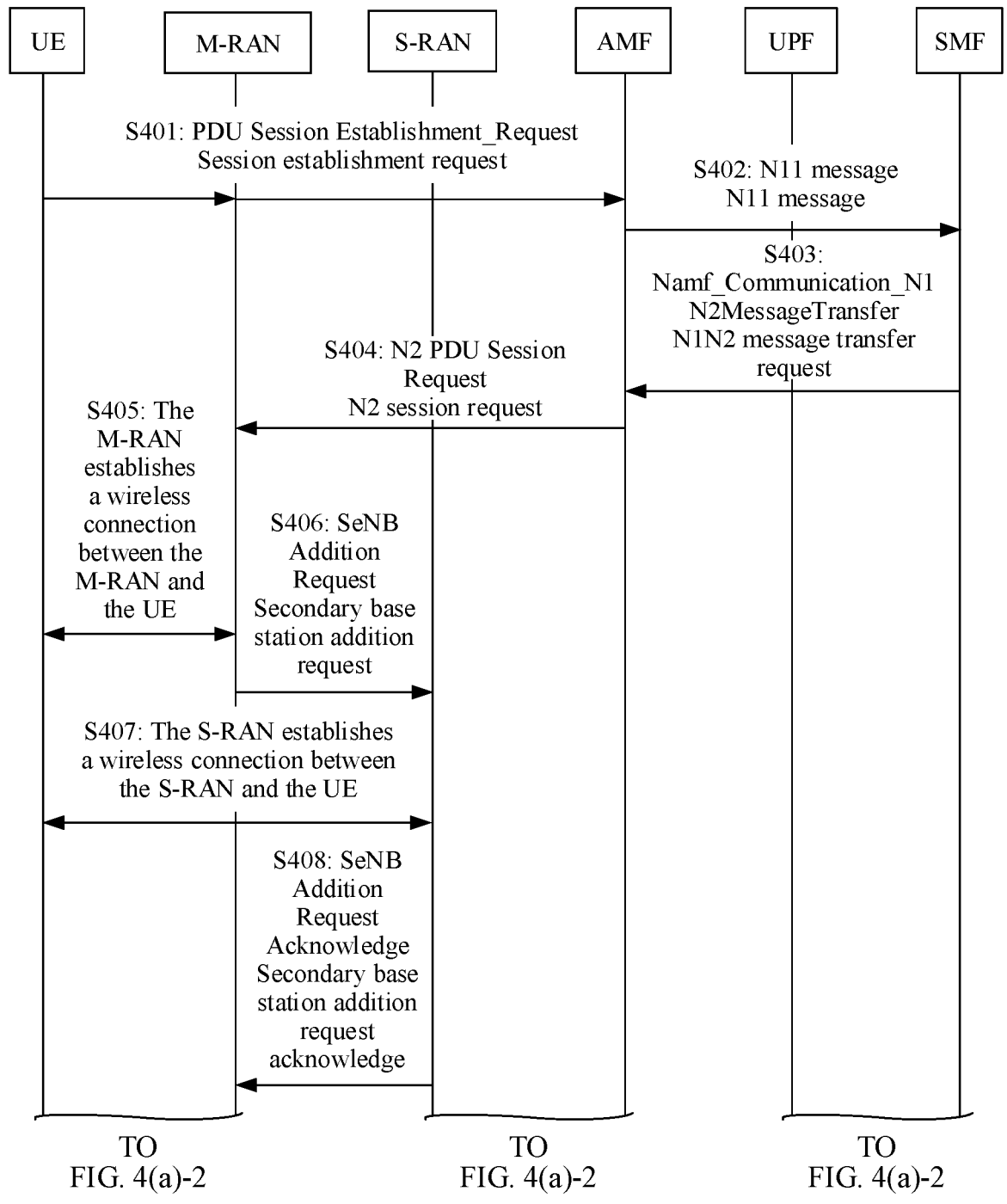
Figures 2, 4A:
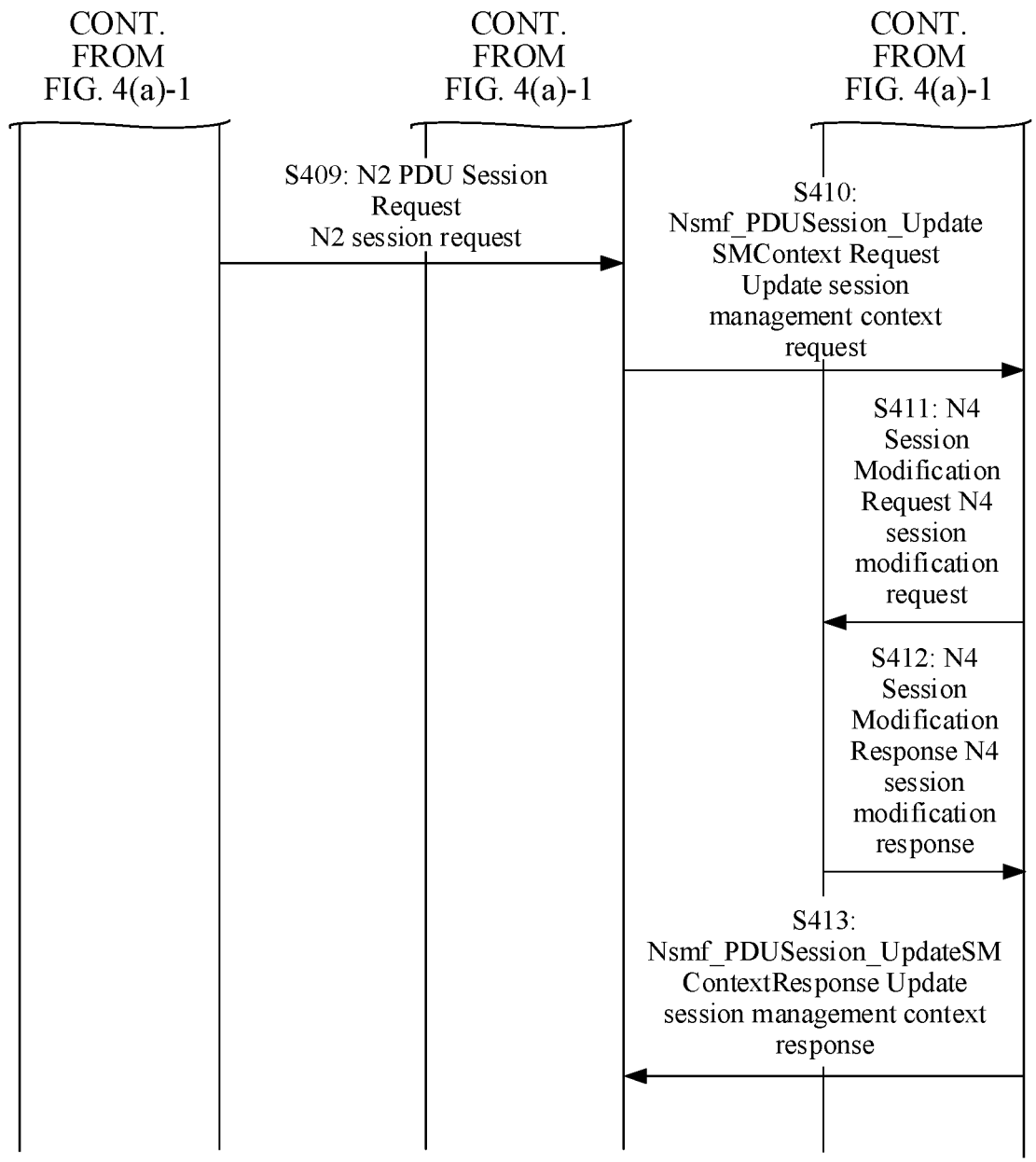
Figure 4B:
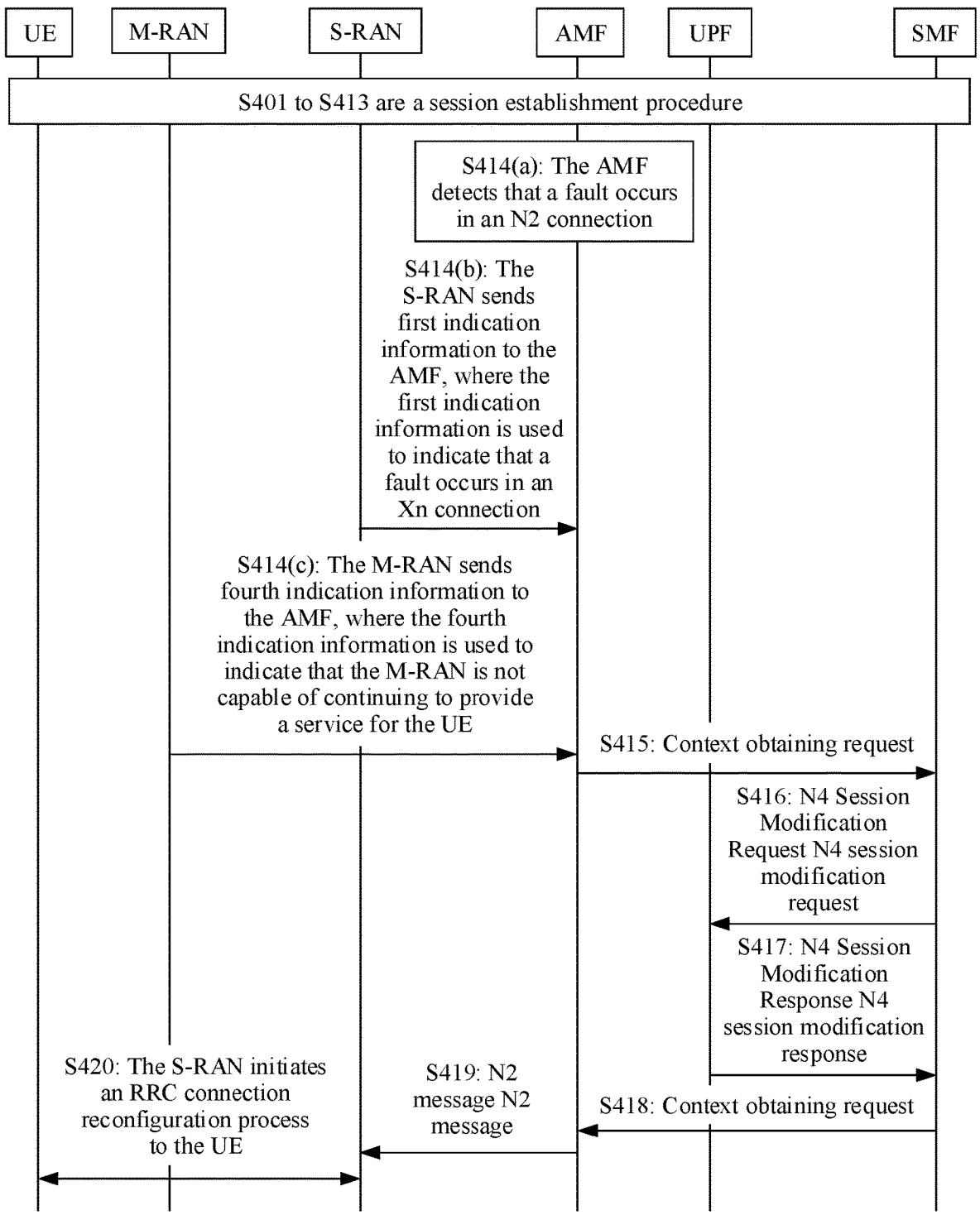
FIG. 4(*a*)-1 and FIG. 4(*a*)-2 are a schematic diagram of a session establishment procedure according to an embodiment of this application.

FIG. 4 shows that when an AMF determines that an M-RAN is not capable of continuing to provide a service for UE, the AMF actively sends a UE context to an S-RAN, to establish an N2 connection between the S-RAN and the AMF. Two procedures are included: a session establishment procedure shown in FIG. 4(a) and a UE context transmission procedure shown in FIG. 4(b).

FIG. 4(a) is a flowchart of the session establishment procedure. The UE initiates the session establishment procedure. After the session establishment procedure is completed, the UE has established two user plane connections between the UE and a DN. Network elements included in a first user plane path are the UE, the M-RAN, a UPF, and the DN. Network elements included in a second user plane path are the UE, the S-RAN, the UPF, and the DN.

S401: The UE sends a NAS message to the AMF by using the M-RAN.

For example, the NAS message includes a session establishment request (PDU Session Establishment Request), and the session establishment request is used to request a core network to establish a session for the UE. For example, the session establishment request includes a PDU session identifier (PDU session ID) allocated by the UE to the session. The NAS message further includes information such as single network slice selection assistance information (S-NSSAI), a data network name (DNN), and a PDU session ID.

The AMF selects an SMF based on the NAS message, and stores a correspondence between a PDU session ID and an SMF ID. The SMF ID is an identifier corresponding to the SMF selected by the AMF. For example, the AMF selects an SMF based on the S-NSSAI and the DNN in the NAS message.

S402: The AMF sends an N11 message to the SMF.

For example, the N11 message is a create session management context request (Nsmf_PDUSession_CreateSMContext Request). The create session management context request includes the session establishment request.

Further, the SMF may select, based on the N11 message, a UPF that provides a packet forwarding service for the UE.

S403: The SMF sends an N1N2 message transfer request (N1N2 Message Transfer Request) to the AMF.

For example, the N1N2 message transfer request includes session management information (N1 SM information, or N1 SM info) sent to the UE and session management information (N2 SM information, or N2 SM info) sent to the M-RAN. The N1 SM info includes a session accept message sent to the UE. The N2 SM info includes user plane function tunnel information (UPF tunnel info) sent to the M-RAN, a PDU session ID, a QFI(s), a QoS profile (QoS Profile(s)), a session aggregate maximum bit rate (Session-AMBR, per Session Aggregate Maximum Bit Rate), a PDU session type (PDU Session Type), and the like.

S404: The AMF sends an N2 session request (N2 PDU Session Request) to the M-RAN.

For example, the N2 session request includes the N1 SM info and the N2 SM info.

In an embodiment, the N2 session request further includes an AMF UE N2AP ID. The AMF UE N2AP ID is an identifier that uniquely identifies the UE on the N2 interface and that is allocated by the AMF.

S405: The M-RAN establishes a wireless connection between the M-RAN and the UE.

The following operations S406 to S413 describe a process in which the S-RAN is added to the M-RAN to form a DC architecture.

S406: The M-RAN sends a secondary base station addition request (SeNB Addition Request) to the S-RAN.

In an embodiment, the secondary base station addition request carries a UE identifier, for example, the AMF UE N2AP ID. S406 may be a specific implementation of Manner 2 in the implementation in which the access and mobility management function network element and the secondary base station need to obtain of the user identifier information in advance in the embodiment shown in FIG. 3. The UE identifier may alternatively be another identifier, for example, an AMF N1 UE ID. For details, refer to the specific description of the Manner 2 in operation 310 in FIG. 3. Details are not described herein again.

In an embodiment, the secondary base station addition request carries an AMF identifier. When the S-RAN detects that a fault occurs in an Xn connection, the S-RAN may send first indication information to the AMF based on the AMF identifier. For details, refer to the description of Manner 2 in operation 300 in FIG. 3. Details are not described herein again. For implementation of the S-RAN detecting that a fault occurs in the Xn connection, refer to specific descriptions of subsequent operation S414(b). Alternatively, when the UE determines that the M-RAN is not capable of continuing to provide the service for the UE, the UE sends second indication information to the AMF by using the S-RAN. The S-RAN may send the second indication information to the AMF based on the AMF identifier. For details, refer to the description of Manner 3 in operation 300 in FIG. 3. Details are not described herein again.

S407: The S-RAN establishes a wireless connection between the S-RAN and the UE.

Specifically, the S-RAN sends an RRC connection establishment request to the UE, and the UE returns an RRC connection establishment response.

S408: The S-RAN returns a secondary base station addition request acknowledge (SeNB Addition Request Acknowledge) to the M-RAN.

For example, the secondary base station addition request acknowledge carries secondary base station tunnel information (S-RAN tunnel info for short).

S409: The M-RAN returns an N2 session response (N2 PDU Session Response) to the AMF.

For example, the N2 session response includes a PDU session ID and N2 SM info. The N2 SM info includes M-RAN tunnel information (M-RAN tunnel info) and the S-RAN tunnel information (S-RAN tunnel info). The M-RAN tunnel information includes an M-RAN IP address and an M-RAN tunnel endpoint identifier (Tunnel endpoint identifier, TEID). The S-RAN tunnel information includes an S-RAN IP address and an S-RAN tunnel endpoint identifier.

In an embodiment, the N2 session response includes an S-RAN identifier. The AMF stores the S-RAN identifier. The S-RAN identifier is used in a scenario in which the AMF detects that the fault occurs in the N2 connection in Manner 1 in operation 300 in FIG. 3, or in a scenario in which the M-RAN detects that the fault occurs in the RRC connection and sends the notification to the AMF in Manner 4 in operation 300 in FIG. 3. In the two scenarios, the AMF sends an MM context to the S-RAN corresponding to the S-RAN identifier, that is, S419. For the scenario in which the AMF detects that the fault occurs in the N2 connection, refer to operation descriptions of S414(a). For the scenario in which the M-RAN detects that the fault occurs in the RRC connection and sends the notification to the AMF, refer to operation descriptions of S414(c).

It should be understood that the N2 SM info in S403 is sent by the SMF to the UE by using the AMF and the M-RAN, and the N2 SM info in S409 is sent by the M-RAN to the SMF by using the AMF. The N2 SM info in S403 and the N2 SM info in S409 have a same name, but carry different content. For details, refer to descriptions of specific content included in the first N2 SM info and the second N2 SM info in S403 and S409.

S410: The AMF sends an update session management context request (Nsmf_PDUSession_UpdateSMContextRequest) to the SMF.

For example, the update session management context request includes the N2 SM info.

S411: The SMF sends an N4 session modification request (N4 Session Modification Request) to the UPF.

For example, the N4 session modification request includes the M-RAN tunnel info, the S-RAN tunnel info, and a packet forwarding rule.

S412: The UPF sends an N4 session modification response (N4 Session Modification Response) to the SMF.

S413: The SMF returns an update session management context obtaining response (Nsmf_PDUSession_UpdateSM ContextResponse) to the AMF.

FIG. 4(b) is a first flowchart of establishing, after the session establishment procedure is completed, a connection between the AMF and the S-RAN and when the M-RAN is not capable of continuing to provide the service for the UE. In this embodiment, the AMF initiates establishment of the connection between the secondary base station and the AMF. FIG. 4(b) is described with reference to FIG. 3, FIG. 4(a)-1, and FIG. 4(a)-2.

Before the AMF initiates the establishment of the connection between the secondary base station and the AMF, that the AMF obtains that the M-RAN is not capable of continuing to provide the service for the UE may include three cases of S414(a) to S414(c).

S414(a): The AMF detects that a fault occurs in the N2 connection.

S414(a) is an implementation of Manner 1 in the implementation in which the access and mobility management function network element obtains that the master base station is not capable of continuing to provide the service for the terminal device in the embodiment shown in FIG. 3.

S414(b): The S-RAN sends first indication information to the AMF, where the first indication information is used to indicate that a fault occurs in the Xn connection.

In this case, the S-RAN stores an AMF identifier before sending the first indication information to the AMF. Specifically, the secondary base station addition request sent by the M-RAN to the S-RAN carries the AMF identifier in S406. When the S-RAN detects a fault occurs in the Xn connection, the S-RAN sends the first indication information to the AMF corresponding to the AMF identifier.

Therefore, in S406, the secondary base station addition request sent by the M-RAN to the S-RAN carries the AMF identifier. When the S-RAN detects that a fault occurs in the Xn connection, the S-RAN sends the first indication information to the AMF corresponding to the AMF identifier.

S414(*b*) is an implementation of Manner 2 in the implementation in which the access and mobility management function network element obtains that the master base station is not capable of continuing to provide the service for the terminal device in the embodiment shown in FIG. 3. In addition, after receiving the first indication information from the S-RAN, the AMF further needs to determine whether a fault occurs in the N2 connection. When a fault occurs in the N2 connection, the AMF determines that the M-RAN is not capable of continuing to provide the service for the UE.

S414(*c*): The M-RAN sends fourth indication information to the AMF, where the fourth indication information is used to indicate that the M-RAN is not capable of continuing to provide the service for the UE.

S414(*c*) is an implementation of Manner 4 in the implementation in which the access and mobility management function network element obtains that the master base station is not capable of continuing to provide the service for the terminal device in the embodiment shown in FIG. 3.

It should be understood that when at least one of S414(*a*) to S414(*c*) is performed, the AMF obtains that the M-RAN is not capable of continuing to provide the service for the UE, and continues to perform S415.

S415: The AMF sends a context obtaining request to the SMF.

Optionally, the AMF does not trigger the SMF to release a user plane connection to the S-RAN.

In an embodiment, if the AMF stores correspondences between a plurality of PDU session IDs of the UE and a plurality of SMF IDs, the AMF sends the context obtaining request to the plurality of SMFs. In this case, the context obtaining request carries a cause value, and the cause is used to indicate the SMF to return an SM context corresponding to a service on the user plane path that passes through the M-RAN. For example, it is assumed that the UE has three sessions: a session 1, a session 2, and a session 3. A correspondence between a session and an SMF, and a correspondence between a session and a user plane connection are shown in the following Table 1:

TABLE 1

| Session | SMF corresponding to the session | User plane connection passing through the M-RAN or the S-RAN |
| --- | --- | --- |
| Session 1 | SMF 1 | M-RAN |
| Session 2 | SMF 2 | M-RAN |
| Session 3 | SMF 3 | S-RAN |

Because the M-RAN is not capable of continuing to provide the service for the UE, a fault occurs in service transmission of the session 1 and the session 2, and the service transmission of the session 1 and the session 2 may be migrated to a user plane path that passes through the S-RAN. Therefore, the AMF sends, based on the stored correspondence between a session identifier and an SMF identifier, a context obtaining request to a plurality of SMFs, where the context obtaining request carries a cause value. In an embodiment, the cause value may be an identifier of the M-RAN, and is used to indicate the SMF to return an SM context corresponding to a service on the user plane path that passes through the M-RAN. After receiving the context obtaining request, the SMF determines whether a user plane path of a session managed by the SMF passes through the M-RAN. If the user plane path passes through the M-RAN, the SMF returns the SM context corresponding to the session. If the user plane path does not pass through the M-RAN, the SMF does not return any SM context. As shown in Table 1, the SMF 1 returns an SM context corresponding to the session 1, the SMF 2 returns an SM context corresponding to the session 2, and the SMF 3 returns no SM context.

In an embodiment, the AMF may store a correspondence among a PDU session ID, an SMF ID, and an S-RAN ID. For example, the AMF may store a correspondence between a PDU session ID and an SMF ID by using an operation omitted in FIG. 4(*a*)-1 and FIG. 4(*a*)-2. Further, the AMF may store a correspondence between a PDU session ID and an S-RAN ID through S409. Therefore, the AMF may obtain and store the correspondence among a PDU session ID, an SMF ID, and an S-RAN ID. Before the AMF sends the context obtaining request to the SMF, if the UE corresponds to a plurality of PDU session IDs, the AMF determines, from the plurality of PDU session IDs, PDU session IDs that store corresponding S-RAN IDs, and further determines, based on another session other than the PDU session IDs, an SMF ID corresponding to the another session, and sends a context obtaining request to an SMF corresponding to the determined SMF ID. For example, the UE has three sessions, and user plane paths of a session 1 and a session 2 pass through the M-RAN. As shown in Table 2, the AMF stores a correspondence between a session identifier and an SMF identifier. Because a user plane path of a session 3 passes through the S-RAN, according to this implementation, the AMF further stores a correspondence among a session identifier, an SMF identifier and an S-RAN identifier. The S-RAN identifier stored by the AMF may be represented in a form of an S-RAN ID or yes. A specific representation manner is not limited in this application.

TABLE 2

| Session | SMF corresponding to the session | Whether an S-RAN ID is stored |
| --- | --- | --- |
| Session 1 | SMF 1 | — |
| Session 2 | SMF 2 | — |
| Session 3 | SMF 3 | S-RAN/yes |

In an embodiment, as shown in Table 2, the AMF determines, from Table 2, that a session that stores the corresponding S-RAN ID is the session 3, and then sends the context obtaining request to the SMF 1 corresponding to the session 1, and sends the context obtaining request to the SMF 2 corresponding to the session 2. The SMF 1 returns an SM context corresponding to the session 1, and the SMF 2 returns an SM context corresponding to the session 2.

S416: The SMF sends an N4 session modification request.

The N4 session modification request includes an updated packet forwarding rule.

It should be understood that the updated packet forwarding rule is a packet forwarding rule obtained after the UPF updates the packet forwarding rule in operation S411 in FIG. 4(*a*)-1 and FIG. 4(*a*)-2. For example, assuming that a service accessed by the session 1 of the UE is a URLLC service, the packet forwarding rule mentioned in S416 is used to indicate the UPF to send, when receiving a packet corresponding to a downlink service, the packet to the UE by using the S-RAN instead of sending the packet to the UE through the two user plane paths. Alternatively, it is assumed that a service accessed by the session 2 of the UE is transmitted by using the user plane path of the M-RAN, and the packet forwarding rule mentioned in S416 is used to indicate the UPF to send, when receiving a packet corresponding to a downlink service, the packet to the UE by using the S-RAN instead of sending the packet to the UE by using the M-RAN.

S417: The UPF returns an N4 session modification response.

S418: The SMF returns a context obtaining response to the AMF.

In an embodiment, the context obtaining response carries N2 SM info. The N2 SM info herein is an SM context, and may include information such as a session type and a QoS parameter.

For example, as shown in Table 1, the SMF 1 returns the SM context corresponding to the session 1, and the SMF 2 returns the SM context corresponding to the session 2.

For another example, it is assumed that the UE has only the session 1, and a service accessed by the session is a URLLC service (that is, a packet transmitted through the user plane path of the M-RAN is the same as a packet transmitted through the user plane path of the S-RAN). In this case, the SMF does not return an SM context, for example, UPF tunnel info or a PDU session ID. This is because the S-RAN already has the SM context corresponding to the session during session establishment and does not need to return the SM context again. In this case, in a possible design, the context obtaining response is an empty message, and does not carry any SM context. In another possible design, the context obtaining response carries a cause value, and the cause value is used to indicate that the SM context returned by the SMF is empty.

It should be understood that the context obtaining request may be an update session management context request (Update SM Context request). Similarly, the session context obtaining response may be an update session management context response.

In addition, when a service on the user plane path that passes through the M-RAN is at a service flow granularity, the cause value is used to indicate the SMF to return an SM context corresponding to the service flow.

S419: The AMF sends an N2 message to the S-RAN.

For example, the N2 message includes an MM context and the N2 SM info.

For example, before the AMF detects that a fault occurs in the N2 connection, in S409 in FIG. 4(*a*)-1 and FIG. 4(*a*)-2, the M-RAN sends the N2 session response to the AMF, where the N2 session response carries the S-RAN identifier, and the AMF stores the S-RAN identifier. When the AMF detects that a fault occurs in the N2 connection, the AMF sends the N2 message to the S-RAN corresponding to the S-RAN identifier, where the N2 message carries the MM context.

Therefore, in S409, the N2 session response sent by the M-RAN to the AMF carries the S-RAN identifier, so that the AMF can obtain of the S-RAN identifier. When the AMF detects that a fault occurs in the N2 connection, the AMF may send the N2 message to the S-RAN corresponding to the S-RAN identifier, where the N2 message carries the MM context.

For example, before the M-RAN sends the fourth indication information to the AMF, in S409 in FIG. 4(*a*)-2, the M-RAN sends the S-RAN identifier to the AMF, and the AMF stores the S-RAN identifier. When the M-RAN sends the fourth indication information to the AMF, the AMF sends the N2 message to the S-RAN corresponding to the S-RAN identifier, where the N2 message carries the MM context.

Therefore, in S409, the N2 session response sent by the M-RAN to the AMF carries the S-RAN identifier, so that the AMF can obtain of the S-RAN identifier. When the AMF receives the fourth indication information sent by the M-RAN, the AMF may send the N2 message to the S-RAN corresponding to the S-RAN identifier, where the N2 message carries the MM context.

S420: The S-RAN initiates an RRC connection reconfiguration process to the UE.

The S-RAN initiates the RRC connection reconfiguration process to the UE based on a received UE context (that is, the MM context and the SM context).

Before the S-RAN receives the MM context, in S406 in FIG. 4(*a*)-1, the M-RAN sends the secondary base station addition request to the S-RAN, where the secondary base station addition request carries the UE identifier. The UE identifier is used to indicate the S-RAN to associate the MM context with a radio bearer, and the radio bearer is a radio bearer between the UE and the S-RAN. Therefore, the S-RAN may establish an association relationship between the MM context and the UE based on the UE identifier and the MM context, and initiate the RRC connection reconfiguration process to the UE.

According to the foregoing embodiment, after the AMF obtains that the M-RAN is not capable of continuing to provide the service for the UE, the AMF does not trigger the SMF to release the user plane connection to the S-RAN, and the AMF initiates establishment of the connection between the secondary base station and the AMF, so that when the M-RAN is not capable of continuing to provide the service for the UE, the S-RAN is upgraded to the M-RAN thereby ensuring service transmission and improving user experience.

Based on the embodiment shown in FIG. 4, this application discloses a service transmission method. A secondary base station receives an identifier of an AMF network element from a master base station (refer to the foregoing description of S406). The secondary base station determines that a fault occurs in a connection between the master base station and the secondary base station and notifies the access and mobility management function network element that the fault occurs in the connection between the master base station and the secondary base station (refer to the description of S414(*b*)). The secondary base station receives a mobility management context of a terminal device from the access and mobility management function network element. In a possible design, the secondary base station receives a session management context from the access and mobility management function network element, where the session management context is used to reconfigure a connection between the secondary base station and the terminal device.

Figure 5A:
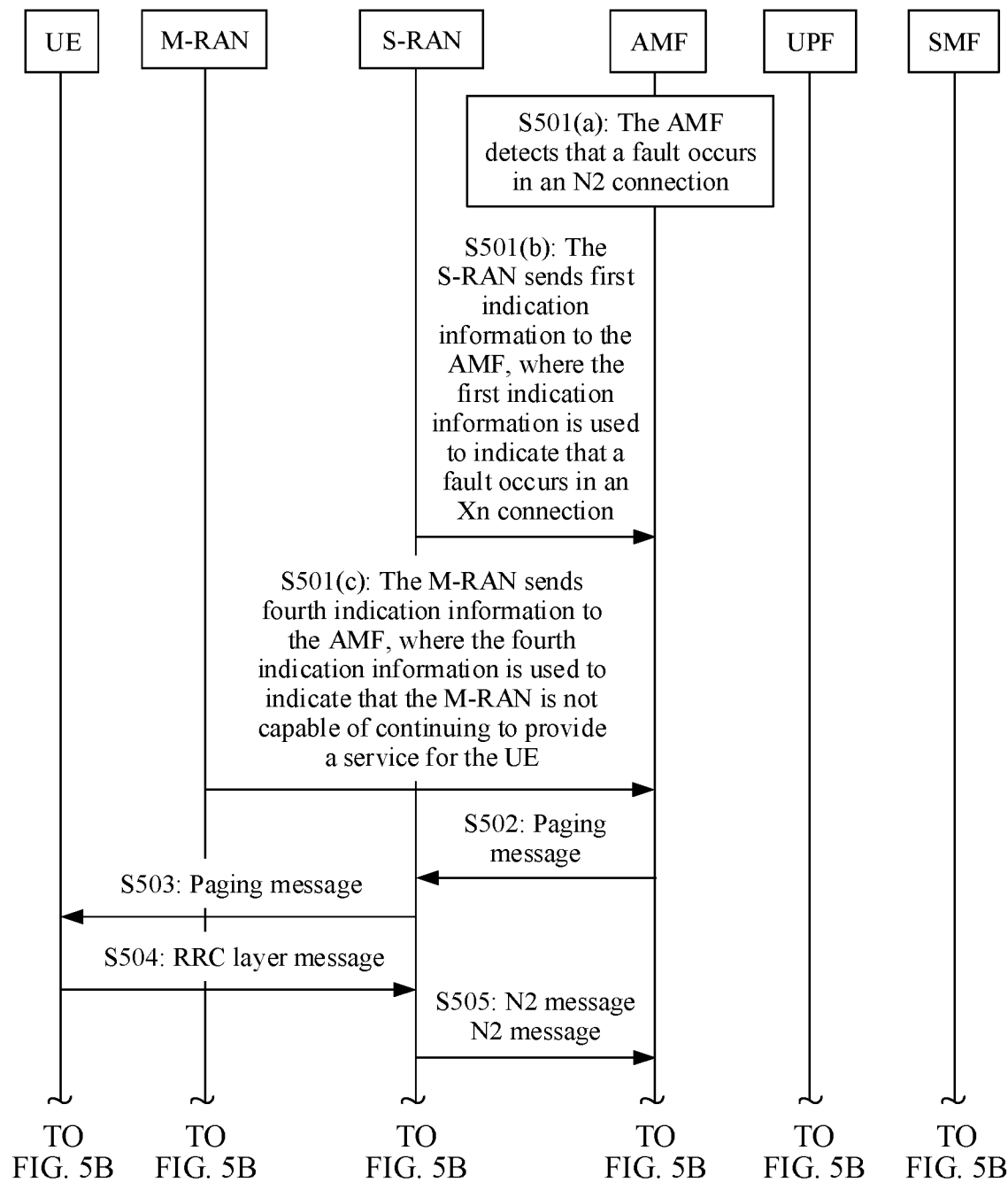
FIG. 5A and FIG. 5B are a second flowchart of establishing a connection between an AMF and an S-RAN when an M-RAN is not capable of continuing to provide a service for UE according to an embodiment of this application.
Figure 5B:
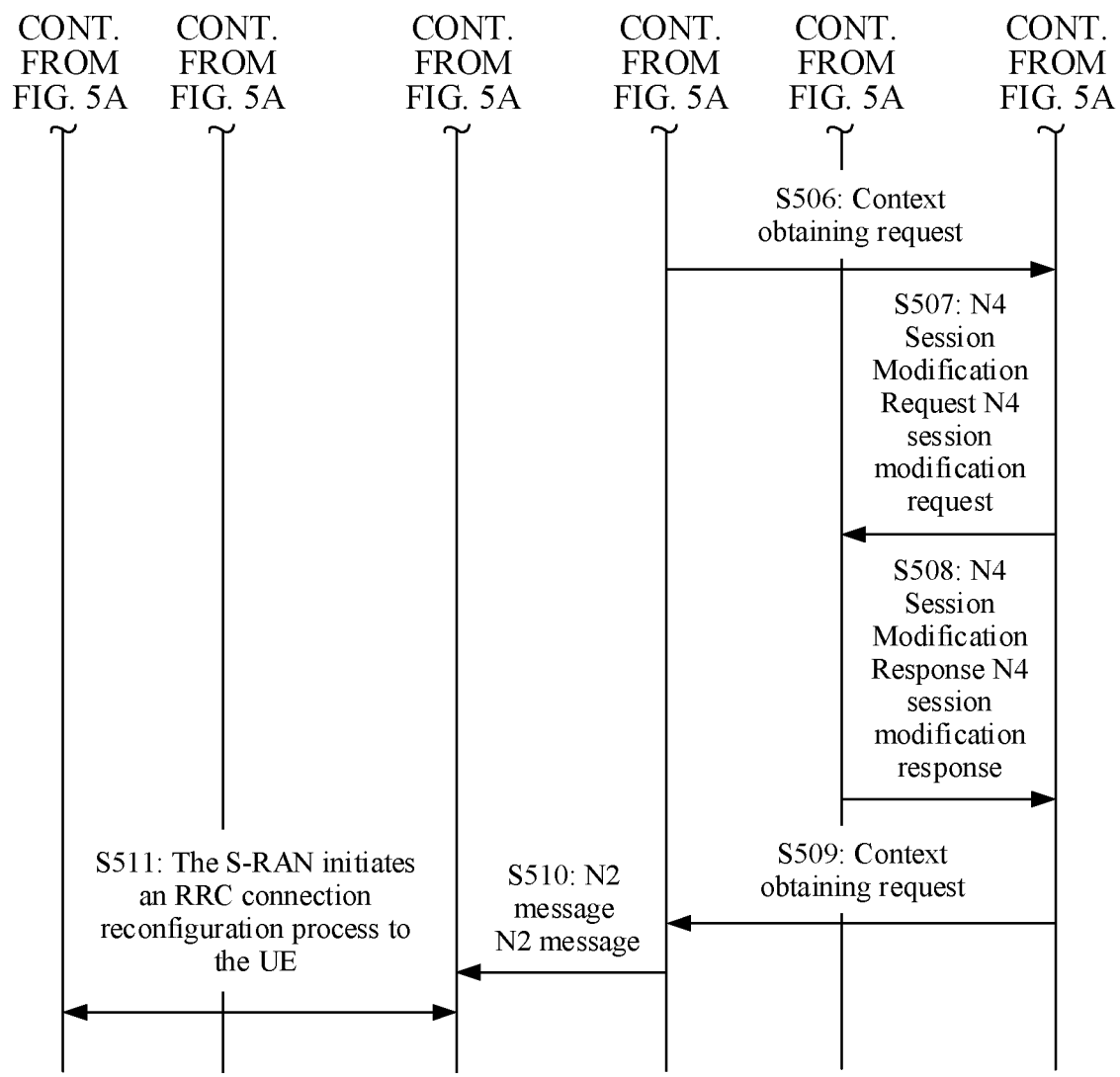

FIG. 5A and FIG. 5B are a second flowchart of establishing, after a session establishment procedure is completed, a connection between an AMF and an S-RAN when an M-RAN is not capable of continuing to provide a service for UE. In this embodiment, the AMF initiates establishment of the connection between the secondary base station and the AMF by paging the UE. FIG. 5A and FIG. 5B are described with reference to FIG. 4(*a*)-1, FIG. 4(*a*)-2, and FIG. 4(*b*).

For S501(a) to S501(c), refer to the descriptions of S414(a) to S414(c) in FIG. 4(b). No repeated description is provided.

S502: The AMF sends a paging message to the S-RAN.

In an embodiment, the AMF does not trigger an SMF to release a user plane connection to the S-RAN.

For example, the paging message carries a cause, and the cause is used to indicate the UE to send an RRC layer message to the S-RAN, to trigger the S-RAN to establish the connection between the S-RAN and the AMF.

The AMF may send the paging message to the S-RAN based on the S-RAN ID stored by the AMF in S409 in FIG. 4(a)-2. It should be understood that a normal paging procedure is to send the paging message to a plurality of RANs, but the paging message in S502 is sent only to the S-RAN.

S503: The S-RAN sends a paging message to the UE. For example, the paging message carries the cause in S502.

S504: The UE sends an RRC layer message to the S-RAN.

For example, the UE sends the RRC layer message to the S-RAN based on the cause in S503.

In an embodiment, the UE further determines a session identifier corresponding to a service on a user plane path that passes through the M-RAN. When the service on the user plane path that passes through the M-RAN is at a service flow granularity, the UE further needs to determine a service flow identifier.

In an embodiment, the RRC layer message carries a session identifier corresponding to the service on the user plane path that passes through the M-RAN. Further optionally, when the service is at a service flow granularity, the service further carries the service flow identifier.

S505: The S-RAN sends an N2 message to the AMF.

For example, the S-RAN sends the N2 message to the AMF based on the RRC layer message.

In an embodiment, when the RRC layer message carries the session identifier, the N2 message carries the session identifier. When the RRC layer message further carries the service flow identifier, the N2 message also carries the service flow identifier. The N2 message may be a path switch request.

S506: The AMF sends a context obtaining request to the SMF.

Optionally, when the N2 message carries the session identifier, the AMF sends the context obtaining request to the SMF corresponding to the session identifier. When the N2 message further carries the service flow identifier, the context obtaining request also carries the service flow identifier.

For S507 to S511, refer to the descriptions of S416 to S420 in FIG. 4(b). No repeated description is provided.

According to the method in an embodiment of the present disclosure, after the AMF obtains that the M-RAN is not capable of continuing to provide the service for the UE, the AMF does not trigger the SMF to release the user plane connection to the S-RAN, and the AMF initiates a special paging procedure by using the S-RAN, to trigger the UE to initiate the RRC layer message to the S-RAN. In this way, the S-RAN can establish the connection with the AMF. When the M-RAN is not capable of continuing to provide the service for the UE, the S-RAN is upgraded to the M-RAN, thereby ensuring service transmission and improving user experience.

Figure 6A:
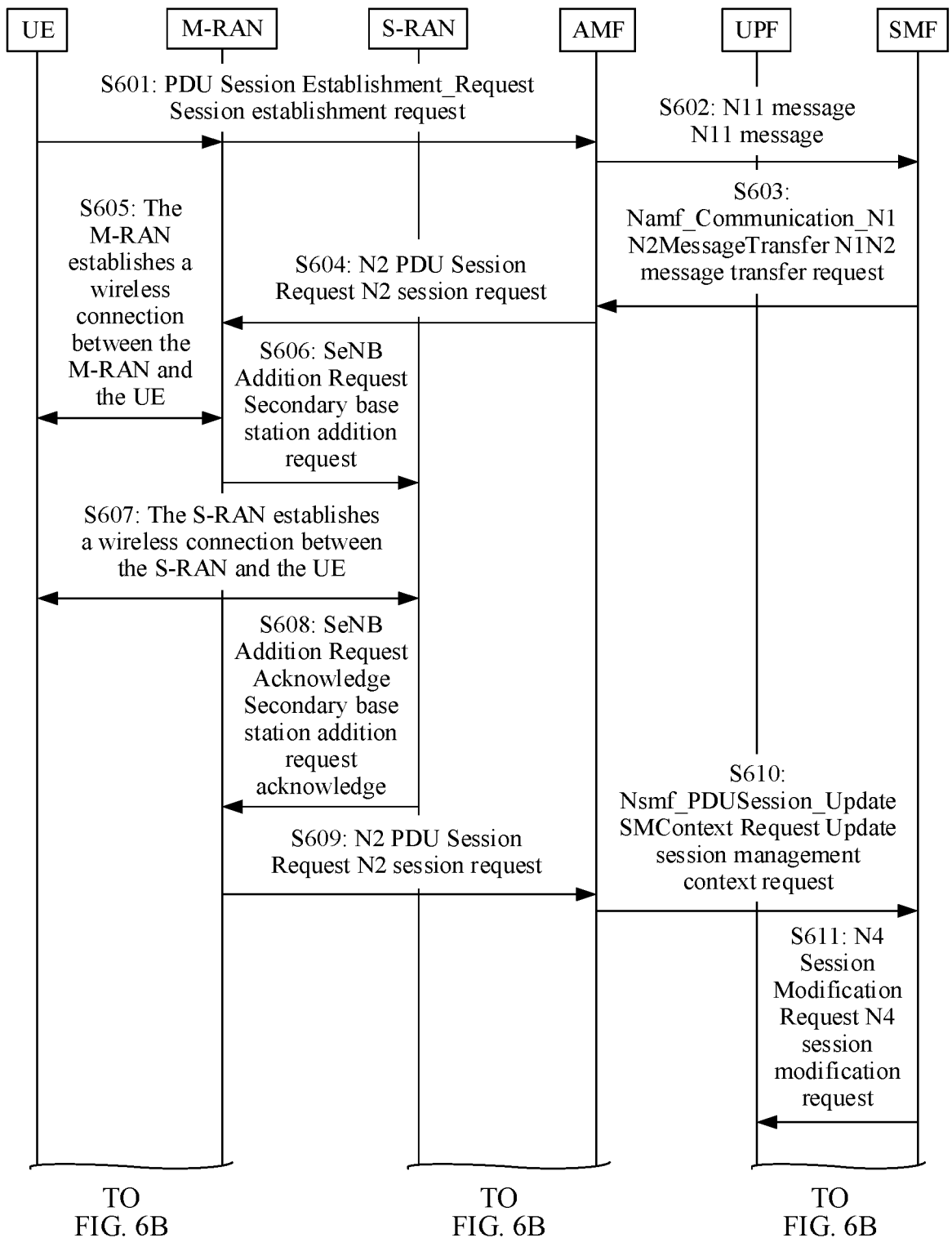
FIG. 6A and FIG. 6B are a flowchart of a session establishment procedure and of establishing a connection between an AMF and an S-RAN when UE determines that an M-RAN is not capable of continuing to provide a service for the UE according to an embodiment of this application.
Figure 6B:
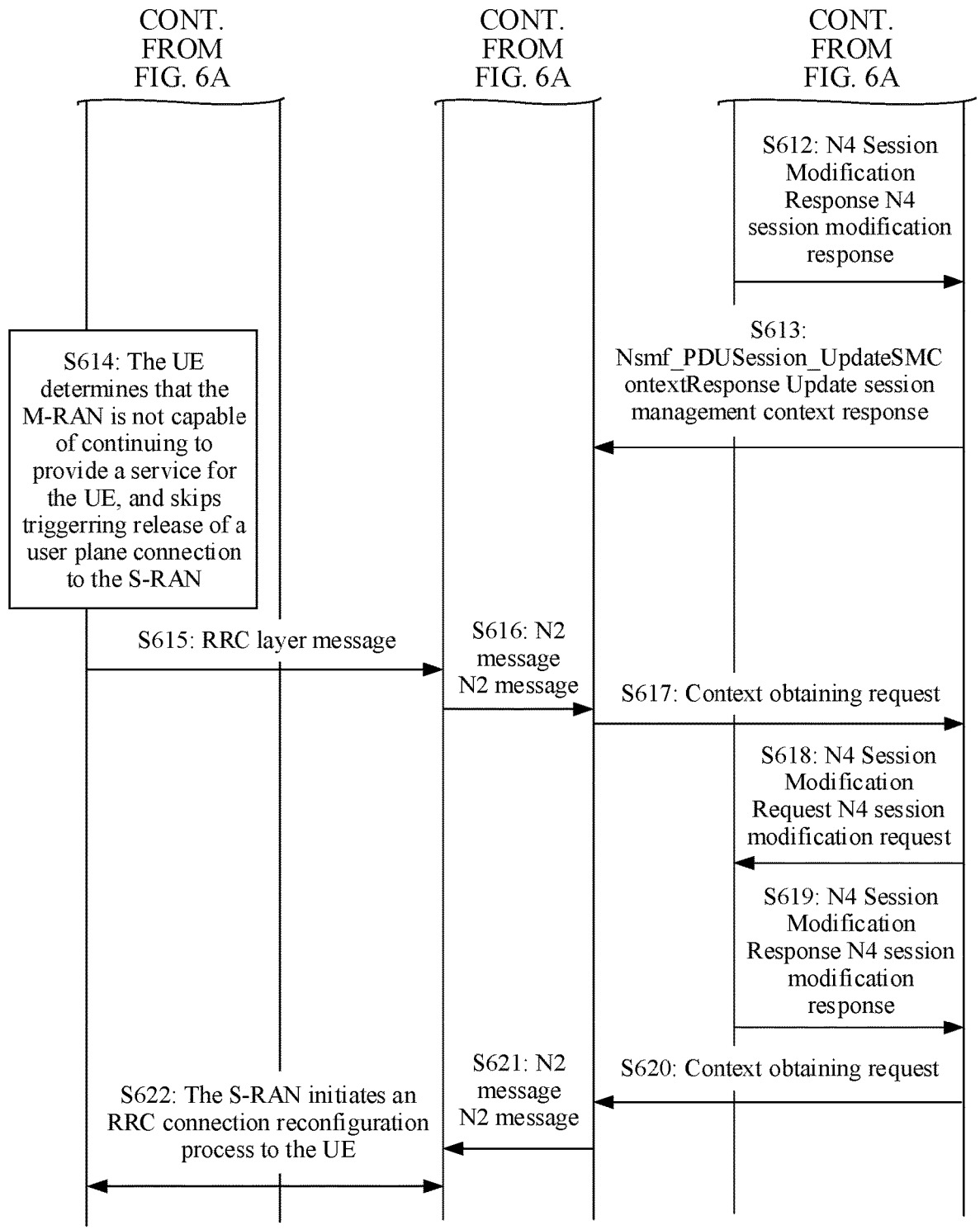

FIG. 6A and FIG. 6B are a flowchart of a session establishment procedure and of establishing a connection between an AMF and an S-RAN when UE determines that an M-RAN is not capable of continuing to provide a service for the UE. In this embodiment, the UE actively initiates a procedure of establishing the connection between the secondary base station and the AMF. FIG. 6A and FIG. 6B are described with reference to FIG. 4(a)-1, FIG. 4(a)-2, and FIG. 4(b).

For S601 and S602, refer to the descriptions of S401 and S402 in FIG. 4(a)-1. No repeated description is provided.

S603: The SMF sends N1N2 Message Transfer to the AMF.

For example, the N1N2 Message Transfer includes N1 SMF info and N2 SM info. The N1 SM info includes a session accept message sent to the UE and third indication (indication) information. The N2 SM info includes UPF tunnel info, a PDU session ID, a QFI(s), a QoS profile(s), session-AMBR, a PDU session type, S-NSSAI, and the like that are sent to the M-RAN.

In an embodiment, the SMF generates the third indication information based on at least one of a QFI, a QoS profile, S-NSSAI, subscription data, a local policy, a PCF policy, or the like.

The third indication information herein is used to indicate the UE to notify, when the UE determines that the M-RAN is not capable of continuing to provide the service for the UE, the AMF that the M-RAN is not capable of continuing to provide the service for the UE. In an embodiment, the third indication information further indicates the UE to release a user plane context related to a wireless connection between the terminal device and the master base station, or skip releasing a user plane-related context (for example, a user plane context related to a wireless connection between the UE and the secondary base station). In other words, the third indication information indicates the UE not to trigger release procedures of all user plane connections. All the user plane connections refer to user plane connections that pass through the M-RAN and user plane connections that passes through the S-RAN.

S604: The AMF sends an N2 session request (N2 PDU Session Request) to the M-RAN.

For example, the N2 session request includes the N1 SM info and the N2 SM info.

S605: The M-RAN initiates a process of establishing a wireless connection between the M-RAN and the UE.

In S605, the M-RAN sends the third indication information generated by the SMF to the UE.

In a possible design, the third indication information is generated by the M-RAN, that is, the N1 SM info does not include the indication information. In S605, the M-RAN sends the third indication information generated by the M-RAN to the UE.

For example, the M-RAN generates the third indication information based on at least one of a QFI, a QoS profile, S-NSSAI, a local policy, or the like.

For S606 to S613, refer to the descriptions of S406 to S413 in FIG. 4(a)-1 and FIG. 4(a)-2. No repeated description is provided.

S614: The UE determines that the M-RAN is not capable of continuing to provide the service for the UE.

Further, the UE does not trigger to release a user plane connection to the S-RAN.

For example, the UE detects that a fault occurs in an RRC connection between the UE and the M-RAN, or the UE receives a notification sent by the M-RAN, where the notification indicates that the M-RAN is not capable of continuing to provide the service for the UE. That the M-RAN determines that the M-RAN is not capable of continuing to provide the service for the UE may mean that the M-RAN detects that a fault occurs in the connection between the M-RAN and the AMF. Optionally, the notification further indicates that a fault occurs in an Xn connection.

S615: The UE sends an RRC layer message to the S-RAN.

The RRC message is used to trigger the S-RAN to establish the connection between the S-RAN and the AMF. The RRC layer message is further used to notify the AMF that the M-RAN is not capable of continuing to provide the service for the UE. The RRC layer message carries indication information, and the indication information is used to indicate that the master base station is not capable of continuing to provide the service for the UE.

In an embodiment, the RRC layer message carries a session identifier corresponding to a service on a user plane path that passes through the M-RAN. Further optionally, when the service is at a service flow granularity, the RRC layer message further carries a service flow identifier.

S616: The S-RAN sends an N2 message to the AMF.

The N2 message is used to notify the AMF that the M-RAN is not capable of continuing to provide the service for the UE.

The N2 message carries the indication information in S616, or the S-RAN generates new indication information based on the indication information in S616, and the N2 message carries the new indication information.

In an embodiment, when the RRC layer message carries the session identifier, the N2 message carries the session identifier. When the RRC layer message further carries the service flow identifier, the N2 message also carries the service flow identifier.

In this case, the S-RAN stores an AMF identifier before sending the N2 message to the AMF. Specifically, in S406, the secondary base station addition request sent by the M-RAN to the S-RAN carries the AMF identifier, and the S-RAN may send the N2 message to the AMF based on the AMF identifier.

Therefore, in S406, the secondary base station addition request sent by the M-RAN to the S-RAN carries the AMF identifier, so that the S-RAN can send the N2 message to the AMF based on the AMF identifier.

S617: The AMF sends a context obtaining request to the SMF.

In an embodiment, when the N2 message carries the session identifier, the AMF sends the context obtaining request to the SMF corresponding to the session identifier. When the N2 message further carries the service flow identifier, the context obtaining request also carries the service flow identifier.

For S618 to S622, refer to the descriptions of S416 to S420 in FIG. 4(b). No repeated description is provided.

According to an embodiment of the present disclosure, when the UE determines that the M-RAN is not capable of continuing to provide the service for the UE, the UE retains the user plane connection between the UE and the S-RAN based on fourth indication information, and sends the RRC layer message to the S-RAN, to trigger the S-RAN to establish the connection between the S-RAN and the AMF. Therefore, when the M-RAN is not capable of continuing to provide the service for the UE, the S-RAN is upgraded to the M-RAN, thereby ensuring service transmission and improving user experience.

Based on the embodiment shown in FIG. 6A and FIG. 6B, this application discloses a service transmission method. A terminal device determines that a master base station is not capable of continuing to provide a service for the terminal device. The terminal device notifies, by using a secondary base station, an access and mobility management function network element that the master base station is not capable of continuing to provide the service for the terminal device (refer to the description of S616). In a possible design, before the terminal device determines that the master base station is not capable of continuing to provide the service for the terminal device, the terminal device receives indication information from the master base station or a session management function network element, where the indication information is used to indicate the terminal device to notify, when determining that the master base station is not capable of continuing to provide the service for the terminal device, the access and mobility management function network element that the master base station is not capable of continuing to provide the service for the terminal device (refer to the description of S603). That the terminal device determines that the master base station is not capable of continuing to provide the service for the terminal device means that the terminal device determines that a fault occurs in a connection between the master base station and the terminal device (refer to the description in S614).

In addition, in a possible design, when the master base station detects that a fault occurs in an RRC connection between the master base station and the terminal device, the master base station sends a message to the secondary base station, where the message triggers establishment of a connection between the secondary base station and the access and mobility management function network element. In an embodiment, the message is further used to notify the secondary base station that the master base station is not capable of continuing to provide the service for the terminal device. Similarly, when the master base station detects that a fault occurs in an N2 connection, the master base station sends a message to the secondary base station, where the message triggers the establishment of the connection between the secondary base station and the access and mobility management function network element.

Figure 7:
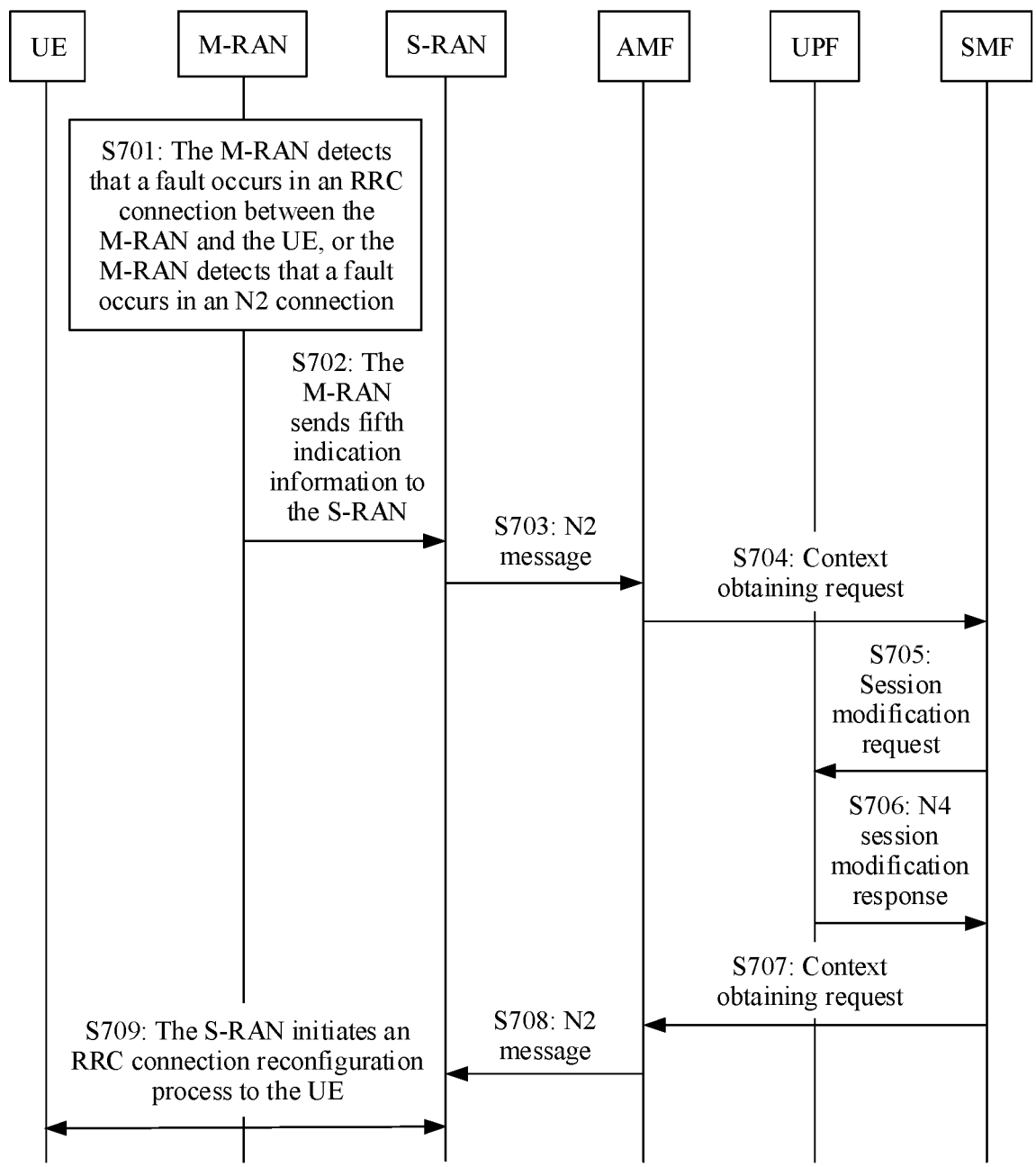
FIG. 7 is a flowchart of establishing a connection between an AMF and an S-RAN when an M-RAN determines that the M-RAN is not capable of continuing to provide a service for UE according to an embodiment of this application.

FIG. 7 is a flowchart of establishing, after a session establishment procedure is completed, a connection between an AMF and an S-RAN when an M-RAN determines the M-RAN is not capable of continuing to provide a service for UE. In this embodiment, the M-RAN actively initiates a procedure of establishing the connection between the secondary base station and the AMF. FIG. 7 is described with reference to FIG. 4(b).

S701: The M-RAN detects that a fault occurs in an RRC connection between the M-RAN and the UE, or the M-RAN detects that a fault occurs in an N2 connection.

S702: The M-RAN sends fifth indication information to the S-RAN.

For example, the fifth indication information is used to enable the S-RAN to establish the connection between the S-RAN and the AMF. The fifth indication information may be an independent information element, or may be a message (for example, a switch request message).

S703: The S-RAN sends an N2 message to the AMF.

The message may be a path switch request message.

For S704 to S709, refer to the descriptions of S415 to S420 in FIG. 4(b). No repeated description is provided.

Compared with the prior art, triggering conditions for upgrading the S-RAN to the M-RAN are all caused by a measurement report of the UE, without considering that the S-RAN is upgraded to the M-RAN because the M-RAN is not capable of continuing to provide the service for the UE. However, in this embodiment of the present disclosure, when the M-RAN determines that the M-RAN is not capable of continuing to provide the service for the UE, the M-RAN actively initiates the procedure of establishing the connection between the S-RAN and the AMF, and sends the fifth indication information to the S-RAN, to trigger the S-RAN to establish the connection between the S-RAN and the AMF. Therefore, when the M-RAN is not capable of continuing to provide the service for the UE, the S-RAN is upgraded to the M-RAN, thereby ensuring service transmission and improving user experience.

In an embodiment, the solutions of the communication methods provided in the embodiments of this application are separately described from a perspective of each network element and from a perspective of interaction between the network elements. It may be understood that, to implement the foregoing functions, the network elements and devices such as the access and mobility management function network element, the terminal device, and the S-RAN, include corresponding hardware structures and/or software modules for performing the functions. A person skilled in the art should be easily aware that, in combination with units and algorithm operations in the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such implementation goes beyond the scope of this application.

Figure 8:
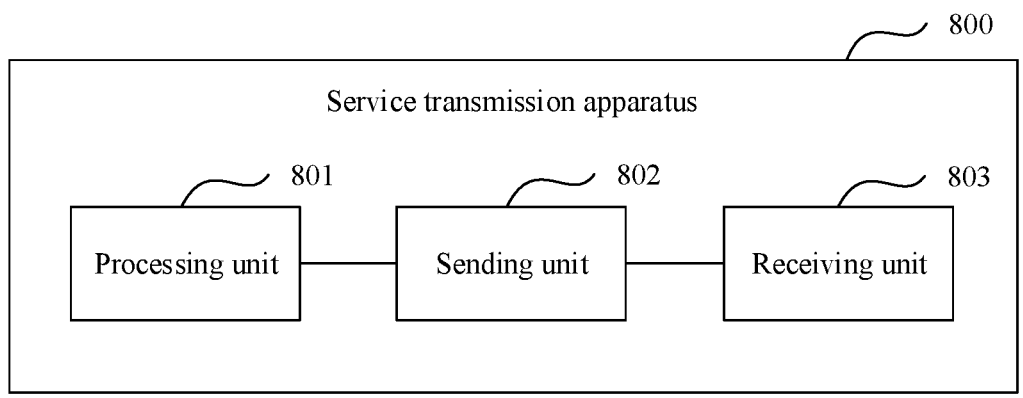
FIG. 8 is a first schematic structural diagram of a service transmission apparatus according to an embodiment of this application.

For example, when the network element implements a corresponding function by using the software module, based on the foregoing embodiments, an embodiment of this application provides a service transmission apparatus. As shown in FIG. 8, the apparatus 800 includes:

a processing unit 801, configured to obtain that a master base station is not capable of continuing to provide a service for a terminal device; and a sending unit 802, configured to send a mobility management context of the terminal device to a secondary base station, where the mobility management context is used by the secondary base station to perform mobility management on the terminal device.

Therefore, after the processing unit 801 obtains that the master base station is not capable of continuing to provide the service for the terminal device, the service transmission apparatus in this embodiment of this application can send the mobility management context of the terminal device to the secondary base station by using the sending unit 802, to quickly establish a signaling connection between the access and mobility management function network element and the secondary base station, thereby ensuring service transmission and improving user experience.

In an embodiment, the apparatus 800 further includes:

a receiving unit 803, configured to: before the sending unit 802 sends the mobility management context of the terminal device to the secondary base station, receive an identifier of the secondary base station from the master base station; or a receiving unit 803, configured to: before the sending unit 802 sends the mobility management context of the terminal device to the secondary base station, receive a first message from the secondary base station, where the processing unit is configured to determine an identifier of the secondary base station based on the first message.

In an embodiment, the processing unit 801 is configured to: determine that a fault occurs in a connection between the master base station and the terminal device; or determine that a fault occurs in a connection between the master base station and the apparatus.

In an embodiment, the receiving unit 803 is configured to receive first indication information from the secondary base station, where the processing unit is configured to determine, based on the first indication information, that the master base station is not capable of continuing to provide the service for the terminal device; or the receiving unit 803 is configured to receive second indication information from the terminal device, where the second indication information is used to indicate that the master base station is not capable of continuing to provide the service for the terminal device.

In an embodiment, the sending unit 802 is further configured to: after the processing unit obtains that the master base station is not capable of continuing to provide the service for the terminal device, send a session management context to the secondary base station, where the session management context is used to reconfigure a connection between the secondary base station and the terminal device.

In an embodiment, the sending unit 802 is configured to send the mobility management context and user identifier information that are of the terminal device to the secondary base station, where the user identifier information is used to indicate the secondary base station to associate the mobility management context with a radio bearer, and the radio bearer is a radio bearer between the terminal device and the secondary base station.

In an embodiment, the receiving unit 803 is further configured to: before the processing unit obtains that the master base station is not capable of continuing to provide the service for the terminal device, receive the user identifier information from the secondary base station by using the master base station; or the sending unit 802 is further configured to: before the processing unit obtains that the master base station is not capable of continuing to provide the service for the terminal device, send the user identifier information to the secondary base station by using the master base station, where the user identifier information is used by the secondary base station to determine an association between the user identifier information and the radio bearer.

In another optional variant, an embodiment of this application provides a service transmission apparatus. For example, the service transmission apparatus may be a chip. The apparatus includes a processor and an interface, and the interface may be an input/output interface. The processor completes a function of the processing unit 801, and the interface completes functions of the receiving unit 803 and the sending unit 802. The apparatus may further include a memory. The memory is configured to store a program that can be run on the processor. When the processor executes the program, the method in the embodiment shown in FIG. 3 is performed.

In addition, the processing unit 801, the sending unit 802, and the receiving unit 803 in the service transmission apparatus may further implement other operations or functions of the access and mobility management function network element in the foregoing method, and details are not described herein again.

In another embodiment, the service transmission apparatus shown in FIG. 8 may be further configured to perform an operation of a terminal device (for example, UE). As shown in FIG. 8, the apparatus 800 includes:

a processing unit 801, configured to determine that a master base station is not capable of continuing to provide a service for the apparatus; and a sending unit 802, configured to notify, by using a secondary base station, an access and mobility management function network element that the master base station is not capable of continuing to provide the service for the apparatus.

Therefore, the service transmission apparatus in this embodiment of this application can trigger, when the processing unit 801 determines that the master base station is not capable of providing the service for the terminal device, the secondary base station to establish a connection between the secondary base station and the access and mobility management function network element, thereby ensuring service transmission and improving user experience.

In an embodiment, the apparatus 800 further includes:

a receiving unit 803, configured to: before the processing unit determines that the master base station is not capable of continuing to provide the service for the terminal device, receive indication information from the master base station or a session management function network element, where the indication information is used to indicate the apparatus to notify, when determining that the master base station is not capable of continuing to provide the service for the terminal device, the access and mobility management function network element that the master base station is not capable of continuing to provide the service for the apparatus.

In an embodiment, the processing unit 801 is configured to determine that a fault occurs in a connection between the master base station and the apparatus.

In addition, the processing unit 801, the sending unit 802, and the receiving unit 803 in the service transmission apparatus may further implement other operations or functions of the terminal device in the foregoing method, and details are not described herein again.

In another embodiment, the service transmission apparatus shown in FIG. 8 may be further configured to perform an operation of a secondary base station (for example, an S-RAN). As shown in FIG. 8, the apparatus 800 includes:

a receiving unit 803, configured to receive an identifier of an access and mobility management function network element from a master base station;

a processing unit 801, configured to determine that a fault occurs in a connection between the master base station and the apparatus; and a sending unit 802, configured to notify the access and mobility management function network element that the fault occurs in the connection between the master base station and the apparatus, where the receiving unit 803 is further configured to receive a mobility management context of a terminal device from the access and mobility management function network element.

Therefore, the service transmission apparatus in an embodiment of the present disclosure can notify, when the processing unit 801 determines that a fault occurs in a connection between the master base station and the secondary base station, the access and mobility management function network element of the fault and receive the mobility management context of the terminal device from the access and mobility management function network element by using the receiving unit 803, so that the secondary base station establishes a connection between the secondary base station and the access and mobility management function network element, thereby ensuring service transmission and improving user experience.

In an embodiment, the receiving unit 801 is further configured to receive a session management context from the access and mobility management function network element, where the session management context is used to reconfigure a connection between the secondary base station and the terminal device.

In addition, the processing unit 801, the sending unit 802, and the receiving unit 803 in the service transmission apparatus may further implement other operations or functions of the secondary base station in the foregoing method, and details are not described herein again.

It should be understood that division into the units is merely logical function division. During actual implementation, all or some of the units may be integrated into one physical entity, or may be physically separated. In addition, all of the units may be implemented in a form of software invoked by a processing element, or may be implemented in a form of hardware; or some units may be implemented in a form of software invoked by a processing element, and some units may be implemented in a form of hardware. In an implementation process, operations in the foregoing method or the foregoing units can be implemented through a hardware integrated logical circuit in a processor element, or through instructions in a form of software.

For example, the foregoing units may be one or more integrated circuits configured to implement the foregoing method, for example, one or more application-specific integrated circuits (ASIC), or one or more microprocessors (DSP), or one or more field programmable gate arrays (FPGA). For another example, when one of the foregoing units is implemented by a program invoked by a processing element, the processing element may be a general-purpose processor, such as a central processing unit (CPU) or another processor that can invoke a program. For another example, the units may be integrated and implemented in a form of a system-on-a-chip (SOC).

Figure 9:
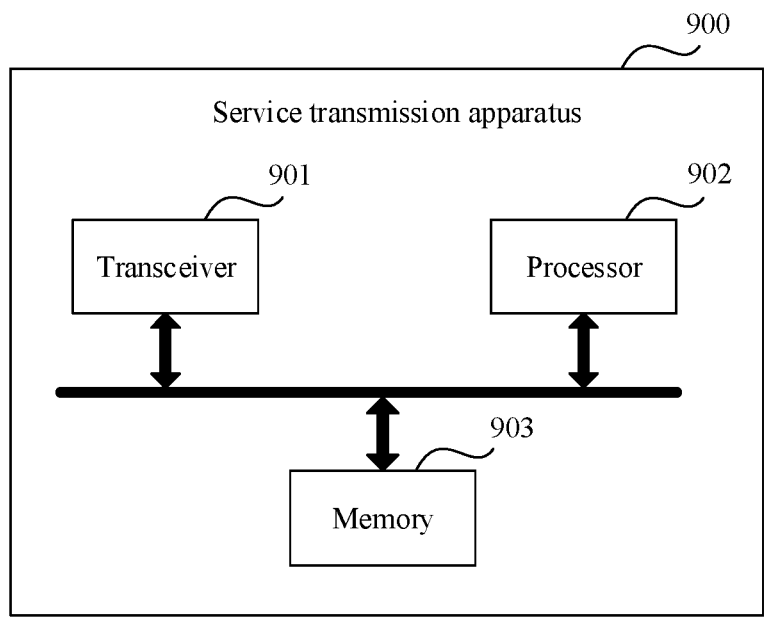
FIG. 9 is a second schematic structural diagram of a service transmission apparatus according to an embodiment of this application.

Based on the foregoing embodiments, an embodiment of this application further provides a service transmission apparatus. Referring to FIG. 9, the apparatus 900 includes a transceiver 901, a processor 902, and a memory 903. The processor may be a CPU, a network processor (NP), a hardware chip, or any combination thereof. The memory may include a volatile memory, for example, a random access memory (RAM). Alternatively, the memory may include a non-volatile memory, such as a read-only memory (ROM), a flash memory, a hard disk drive (HDD), or a solid-state drive (SSD). Alternatively, the memory may include a combination of the foregoing types of memories.

When the apparatus is an access and mobility management function network element, the memory 903 is configured to store a computer program. The processor 902 invokes the computer program stored in the memory 903, and performs, by using the transceiver 901, the method performed by the access and mobility management function network element in the foregoing embodiment. When the apparatus is a terminal device, the memory 903 is configured to store a computer program. The processor 902 invokes the computer program stored in the memory 903, and performs, by using the transceiver 901, the method performed by the terminal device in the foregoing embodiment. When the apparatus is a secondary base station, the memory 903 is configured to store a computer program. The processor 902 invokes the computer program stored in the memory 903, and performs, by using the transceiver 901, the method performed by the secondary base station in the foregoing embodiment.

It may be understood that the apparatus in the embodiment shown in FIG. 8 may be implemented by the apparatus 900 shown in FIG. 9. Specifically, the processing unit 801 may be implemented by the processor 902, and the receiving unit 803 and the sending unit 802 may be implemented by the transceiver 901.

An embodiment of this application further provides a computer-readable storage medium. The computer-readable storage medium stores a computer program. When the computer program is run on a computer, the computer is enabled to perform the method in the embodiments.

In conclusion, after the access and mobility management function network element obtains that the master base station is not capable of continuing to provide the service for the terminal device, the access and mobility management function network element sends the mobility management context of the terminal device to the secondary base station, to quickly establish a signaling connection between the access and mobility management function network element and the secondary base station, thereby ensuring service transmission and improving user experience.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or a processor of another programmable data processing device generate an apparatus for implementing a specific function in one or more procedures in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto the computer or the another programmable data processing device, so that a series of operation operations are performed on the computer or the another programmable device, thereby generating computer-implemented processing. Therefore, the instructions executed on the computer or the another programmable device provide operations for implementing a specific function in one or more procedures in the flowcharts and/or in one or more blocks in the block diagrams.

It is clear that a person skilled in the art can make various modifications and variations to the embodiments of this application without departing from the spirit and scope of this application. In this way, this application is intended to cover these modifications and variations made to the embodiments of this application provided that they fall within the scope of the claims of this application and their equivalent technologies.

What is claimed is:

1. A service transmission method, comprising:
receiving, by an access and mobility management function network element, user identifier information of a terminal device from a secondary base station using a master base station; or
sending, by the access and mobility management function network element, the user identifier information to the secondary base station using the master base station, wherein the user identifier information is used by the secondary base station to determine an association between the user identifier information and a radio bearer;
determining, by the access and mobility management function network element, that the master base station is not capable of continuing to provide a service for the terminal device; and
sending, by the access and mobility management function network element, a mobility management context of the terminal device to the secondary base station, wherein the mobility management context includes at least one of an area restriction, an access technology restriction, or a security context, and wherein the mobility management context is used by the secondary base station to perform mobility management on the terminal device, wherein the sending the mobility management context of the terminal device to the secondary base station comprises:
sending, by the access and mobility management function network element, the mobility management context and the user identifier information of the terminal device to the secondary base station, wherein the user identifier information is used to instruct the secondary base station to associate the mobility management context with the radio bearer between the terminal device and the secondary base station.

2. The method according to claim 1, wherein before sending the mobility management context of the terminal device to a secondary base station, the method further comprises:
receiving, by the access and mobility management function network element, an identifier of the secondary base station from the master base station; or
after receiving a first message from the secondary base station, determining, by the access and mobility management function network element, an identifier of the secondary base station.

3. The method according to claim 1, wherein the determining that a master base station is not capable of continuing to provide a service for a terminal device comprises:
determining, by the access and mobility management function network element, that a fault occurs in a connection between the master base station and the terminal device; or
determining, by the access and mobility management function network element, that a fault occurs in a connection between the master base station and the access and mobility management function network element.

4. The method according to claim 1, wherein the determining that a master base station is not capable of continuing to provide a service for a terminal device comprises:
receiving, by the access and mobility management function network element, first indication information from the secondary base station, and determining, by the access and mobility management function network element based on the first indication information, that the master base station is not capable of continuing to provide the service for the terminal device; or
receiving, by the access and mobility management function network element, second indication information from the terminal device, wherein the second indication information is used to determine that the master base station is not capable of continuing to provide the service for the terminal device.

5. The method according to claim 1, wherein after obtaining that the master base station is not capable of continuing to provide a service for a terminal device, the method further comprises:
sending, by the access and mobility management function network element, a session management context to the secondary base station, wherein the session management context is used to reconfigure a connection between the secondary base station and the terminal device.

6. A service transmission apparatus, comprising:
a memory to store a computer program; and
a processor coupled to the memory, wherein when the computer program is executed by the processor, cause the apparatus to:
receive user identifier information of a terminal device from a secondary base station using a master base station; or
send the user identifier information to the secondary base station using the master base station, wherein the user identifier information is used by the secondary base station to determine an association between the user identifier information and a radio bearer;
determine that a master base station is not capable of continuing to provide a service for a terminal device; and
send a mobility management context of the terminal device to the secondary base station, wherein the mobility management context includes at least one of an area restriction, an access technology restriction, or a security context, and wherein the mobility management context is used by the secondary base station to perform mobility management on the terminal device, wherein the apparatus is further to:
send the mobility management context and the user identifier information of the terminal device to the secondary base station, wherein the user identifier information is used to instruct the secondary base station to associate the mobility management context with the radio bearer between the terminal device and the secondary base station.

7. The apparatus according to claim 6, wherein the computer program, when executed by the processor, further causes the apparatus to:
receive an identifier of the secondary base station from the master base station; or
determine an identifier of the secondary base station based on a first message.

8. The apparatus according to claim 6, wherein the computer program, when executed by the processor, further causes the apparatus to:
determine that a fault occurs in a connection between the master base station and the terminal device; or
determine that a fault occurs in a connection between the master base station and the apparatus.

9. The apparatus according to claim 6, wherein the computer program, when executed by the processor, further causes the apparatus to:
receive first indication information from the secondary base station, and determine, based on the first indication information, that the master base station is not capable of continuing to provide the service for the terminal device; or
receive second indication information from the terminal device, wherein the second indication information is used to determine that the master base station is not capable of continuing to provide the service for the terminal device.

10. The apparatus according to claim 6, wherein the computer program, when executed by the processor, further causes the apparatus to:
send a session management context to the secondary base station, wherein the session management context is used to reconfigure a connection between the secondary base station and the terminal device.

11. A computer storage medium storing a computer executable instruction, which when executed by a computer, causes the computer to:
receive user identifier information of a terminal device from a secondary base station using a master base station; or
send the user identifier information to the secondary base station using the master base station, wherein the user identifier information is used by the secondary base station to determine an association between the user identifier information and a radio bearer;
determine that a master base station is not capable of continuing to provide a service for a terminal device; and
send a mobility management context of the terminal device to the secondary base station, wherein the mobility management context includes at least one of an area restriction, an access technology restriction, or a security context, and wherein the mobility management context is used by the secondary base station to perform mobility management on the terminal device, wherein the computer is further to:
send the mobility management context and the user identifier information of the terminal device to the secondary base station, wherein the user identifier information is used to instruct the secondary base station to associate the mobility management context with the radio bearer between the terminal device and the secondary base station.

12. The computer storage medium according to claim 11, wherein the program further causes the computer to:
receive an identifier of the secondary base station from the master base station; or
determine an identifier of the secondary base station based on a first message.

13. The computer storage medium according to claim 11, wherein the program further causes the computer to:
determine that a fault occurs in a connection between the master base station and the terminal device; or determine that a fault occurs in a connection between the master base station and the apparatus.

14. The computer storage medium according to claim 11, wherein the program further causes the computer to:
receive first indication information from the secondary base station, and determine, based on the first indication information, that the master base station is not capable of continuing to provide the service for the terminal device; or
receive second indication information from the terminal device, wherein the second indication information is used to determine that the master base station is not capable of continuing to provide the service for the terminal device.

15. The computer storage medium according to claim 11, wherein the program further causes the computer to:
send a session management context to the secondary base station, wherein the session management context is used to reconfigure a connection between the secondary base station and the terminal device.

16. The computer storage medium according to claim 11, wherein the program further causes the computer to:
send the mobility management context and user identifier information of the terminal device to the secondary base station, wherein the user identifier information is used to instruct the secondary base station to associate the mobility management context with a radio bearer between the terminal device and the secondary base station.

\* \* \* \* \*